United States Patent
Kohara et al.

(10) Patent No.: US 8,780,364 B2
(45) Date of Patent: Jul. 15, 2014

(54) ELECTRONIC APPARATUS AND INFORMATION DISPLAYING METHOD

(75) Inventors: Tasuku Kohara, Kanagawa (JP); Hiroshi Takeda, Chiba (JP); Kazuo Koike, Kanagawa (JP); Kenichi Yamada, Kanagawa (JP); Taisuke Omi, Kanagawa (JP); Tsuyoshi Endoh, Kanagawa (JP); Masaaki Kawamura, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 208 days.

(21) Appl. No.: 13/362,274

(22) Filed: Jan. 31, 2012

(65) Prior Publication Data
US 2012/0200874 A1  Aug. 9, 2012

(30) Foreign Application Priority Data

Feb. 9, 2011  (JP) .................. 2011-025570

(51) Int. Cl.
*G06F 15/00* (2006.01)
(52) U.S. Cl.
USPC ............................ 358/1.12; 702/150; 702/152
(58) Field of Classification Search
None
See application file for complete search history.

(56) References Cited

U.S. PATENT DOCUMENTS

| | | | |
|---|---|---|---|
| 7,256,900 B1* | 8/2007 | Hanaoka ..................... 358/1.12 |
| 7,516,421 B2* | 4/2009 | Asano et al. ................ 715/850 |
| 7,667,685 B2 | 2/2010 | Yamada et al. | |
| 7,684,721 B2 | 3/2010 | Kohara et al. | |
| 7,822,353 B2 | 10/2010 | Koike et al. | |
| 8,085,242 B2 | 12/2011 | Endoh et al. | |
| 2006/0150031 A1* | 7/2006 | Asauchi ...................... 714/46 |
| 2008/0151313 A1* | 6/2008 | Ishimaru ..................... 358/400 |
| 2009/0060612 A1 | 3/2009 | Kohara et al. | |
| 2009/0066644 A1* | 3/2009 | Endoh et al. ................ 345/157 |
| 2009/0237723 A1* | 9/2009 | Ueda et al. .................. 358/1.15 |
| 2009/0316193 A1 | 12/2009 | Kohara et al. | |
| 2009/0316954 A1 | 12/2009 | Kohara et al. | |
| 2010/0182654 A1 | 7/2010 | Kohara et al. | |
| 2010/0277762 A1* | 11/2010 | Eguchi et al. ............... 358/1.15 |
| 2011/0221735 A1 | 9/2011 | Imai et al. | |

FOREIGN PATENT DOCUMENTS

| | | |
|---|---|---|
| JP | 2009-130640 | 6/2009 |
| JP | 4387961 | 10/2009 |
| JP | 4776952 | 7/2011 |

\* cited by examiner

*Primary Examiner* — Mark Zimmerman
*Assistant Examiner* — Helen Q Zong
(74) *Attorney, Agent, or Firm* — Oblon, Spivak, McClelland, Maier & Neustadt, L.L.P.

(57) ABSTRACT

An electronic apparatus includes a main body of the electronic apparatus; an operation unit including an operation block having a display unit, the operation block being detachable with respect to the main body of the electronic apparatus, and the operation block enabling at least a bidirectional wireless communication with the main body of the electronic apparatus; and a detection unit configured to detect relative positional information between the operation block and the main body of the electronic apparatus, when the operation block is detached from the main body of the electronic apparatus. The operation block being detached from the main body of the electronic apparatus is able to display information corresponding to the relative positional information on the display unit, in accordance with a condition of the main body of the electronic apparatus.

19 Claims, 30 Drawing Sheets

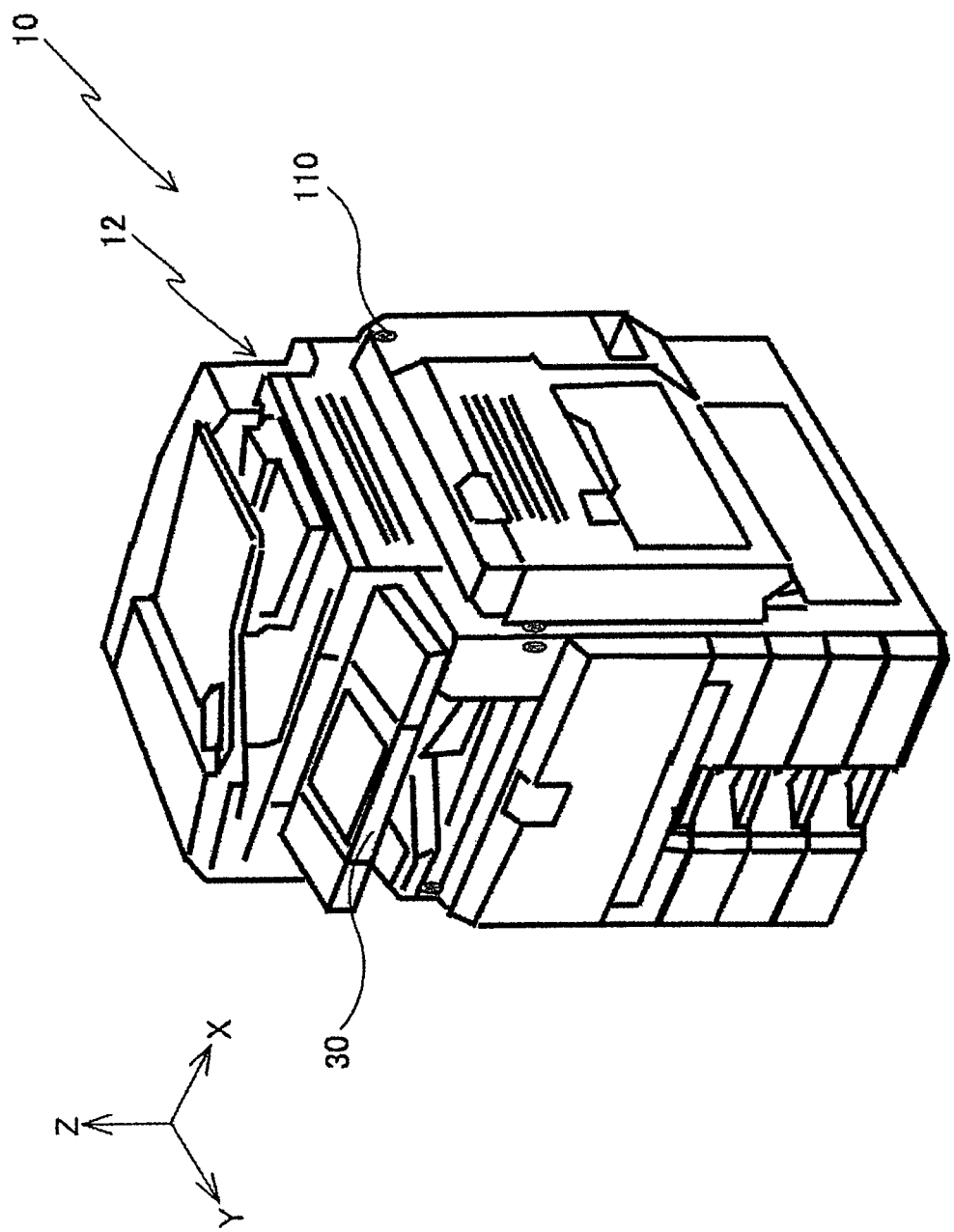

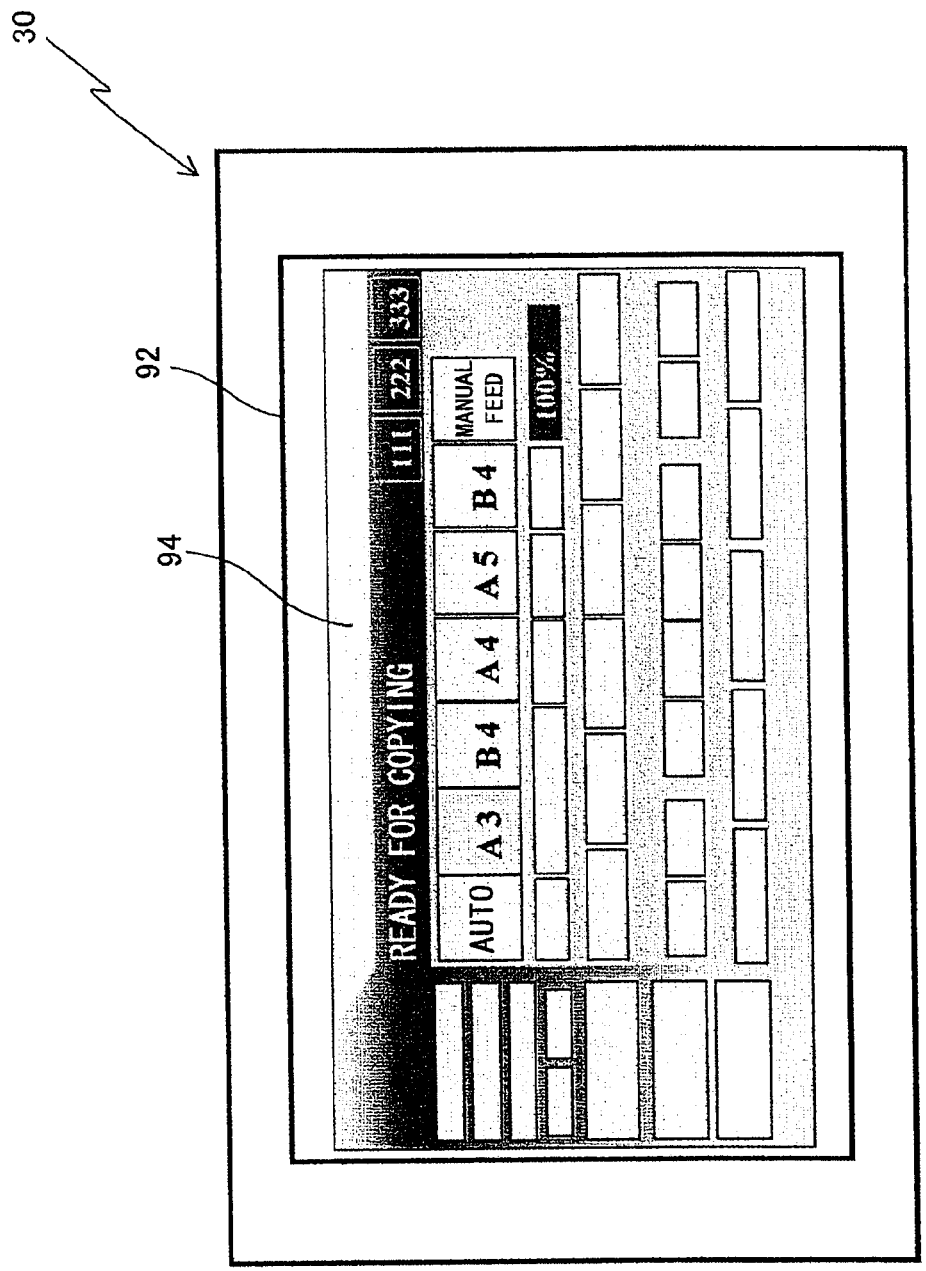

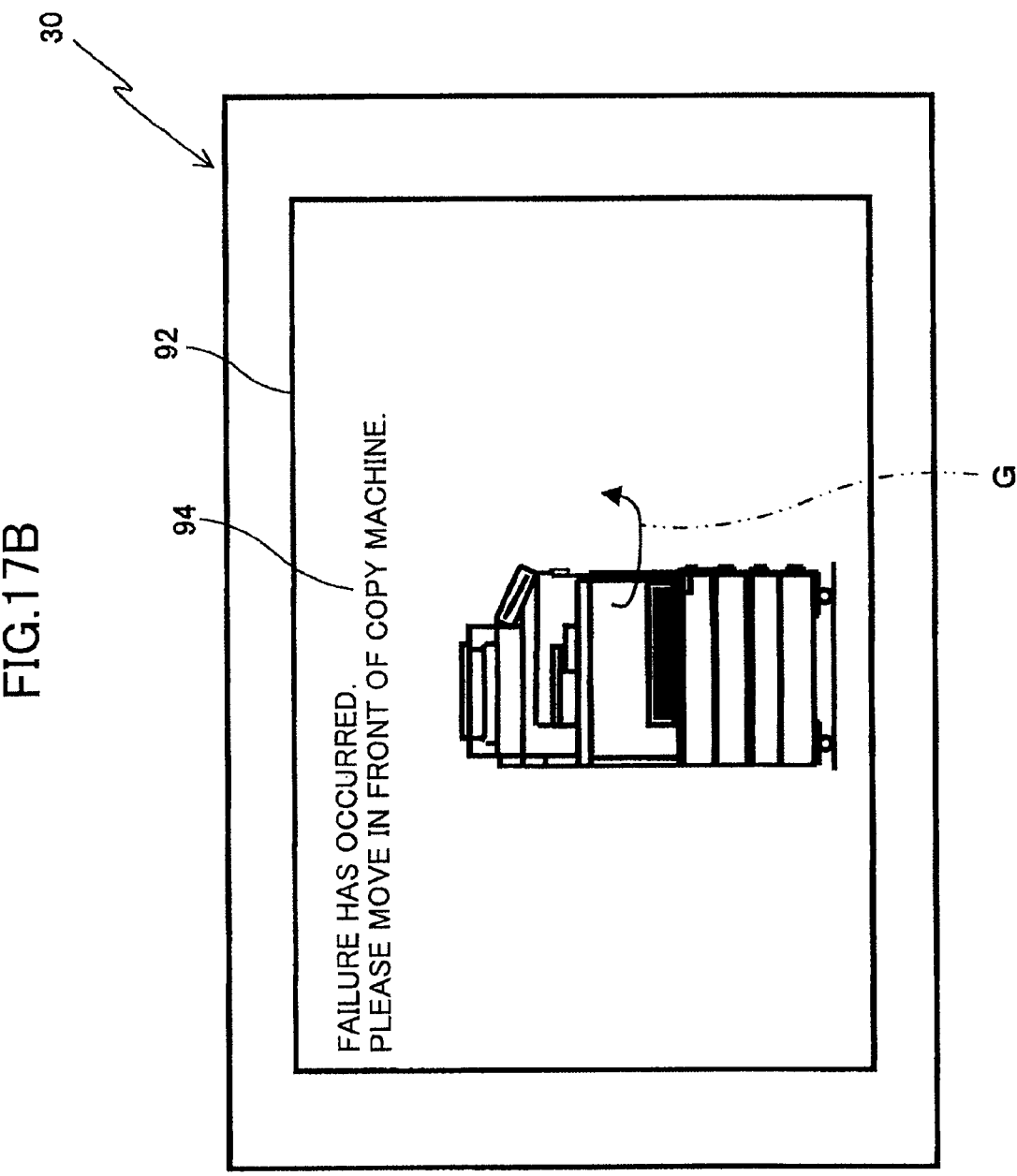

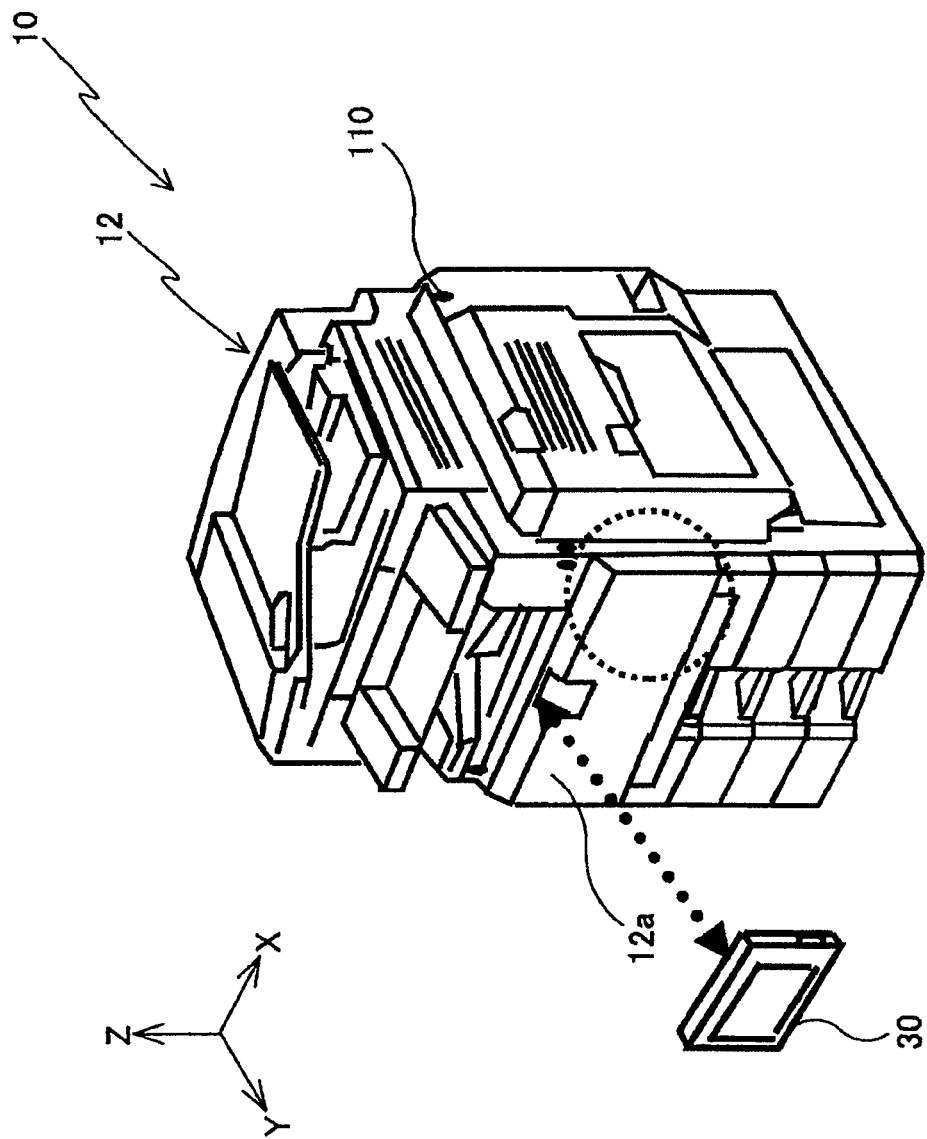

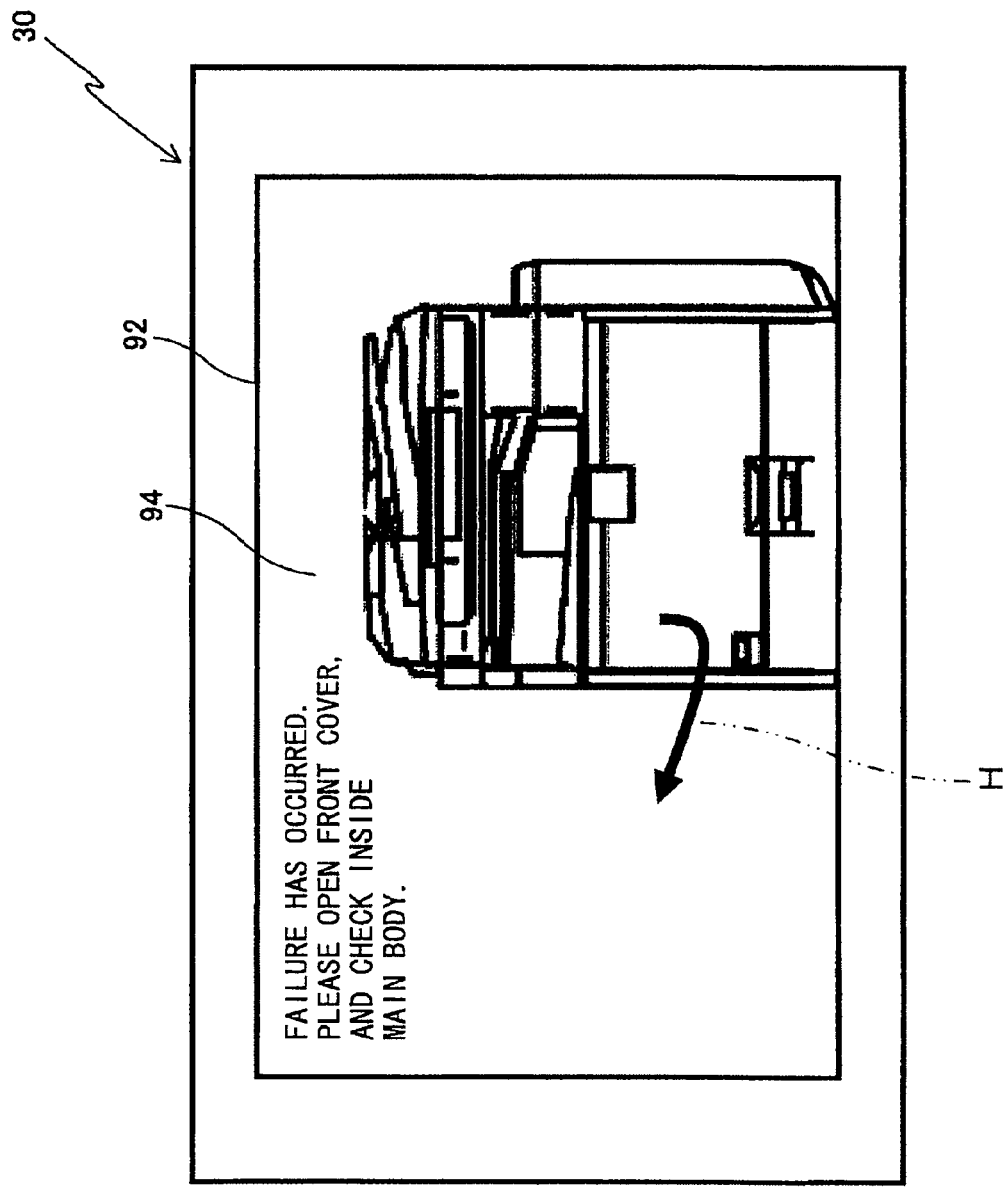

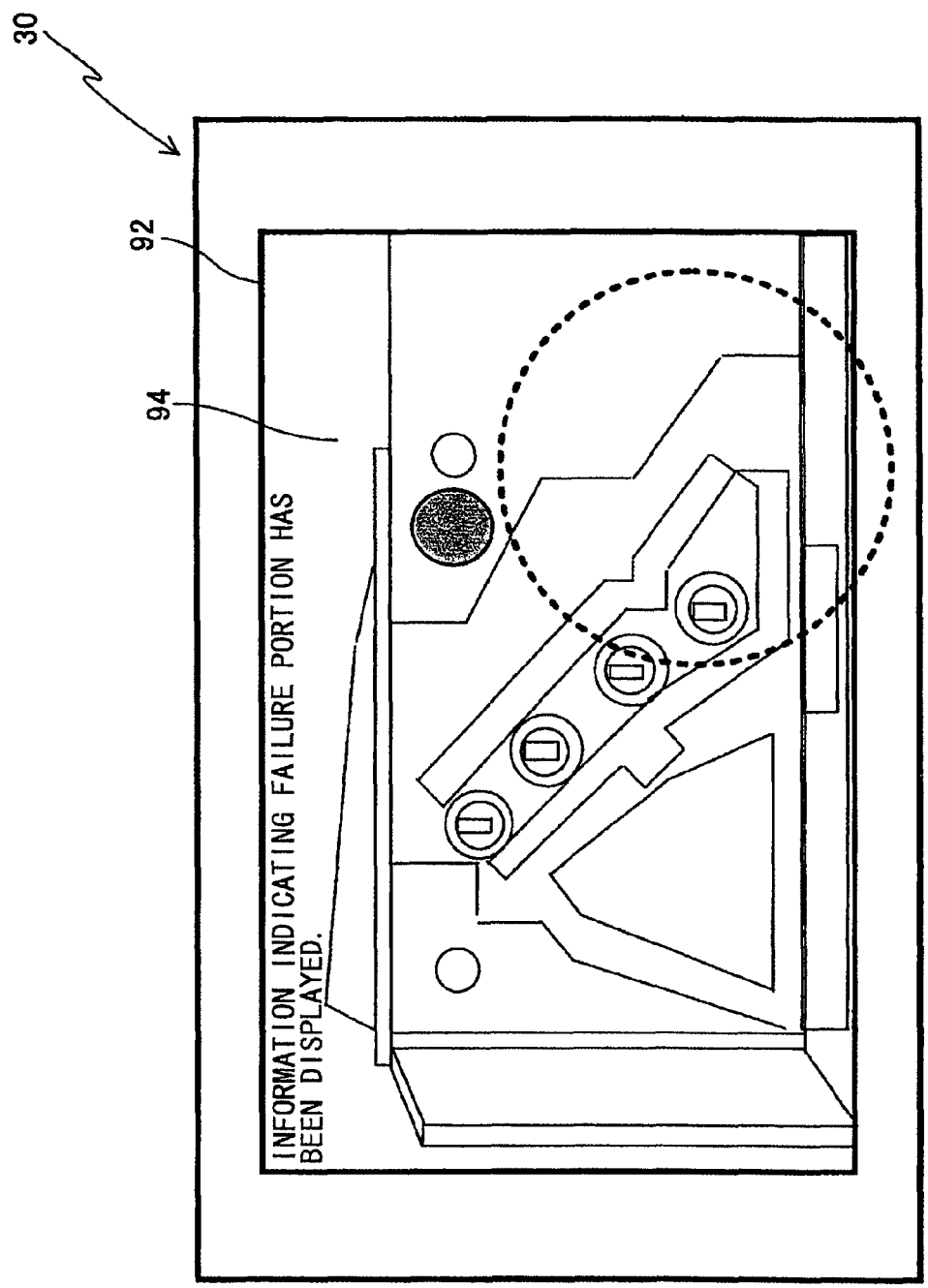

ELECTRONIC APPARATUS AND INFORMATION DISPLAYING METHOD

BACKGROUND OF THE INVENTION

1. Field of the Invention

Embodiments of the present invention relate to an electronic apparatus and an information displaying method. Specifically, the embodiments relate to an electronic apparatus such that a portion of an operation unit attached to a main body of the electronic apparatus is detachable with respect to the main body of the electronic apparatus, and an information displaying method for the electronic apparatus.

2. Description of the Related Art

Conventionally, among electronic apparatuses, such as a copy machine, an electronic apparatus has been known such that a portion of an operation unit (an operation block) for operating a main body of the electronic apparatus is detachable with respect to the main body of the electronic apparatus (e.g., Patent Document 1 (Japanese Published Unexamined Application No. 2006-227171)). When the operation block is detached from the main body of the electronic apparatus, the operation block can perform a wireless bidirectional communication with the electronic apparatus. When a touch panel on a liquid crystal display (LDC) is pressed, the main body of the electronic apparatus is remotely controlled.

However, for example, with the electronic apparatus described in Patent Document 1, when a malfunction occurs in the main body of the electronic apparatus during remote control of the main body of the electronic apparatus by an operator (e.g. a user, or a maintenance personnel) located in a surrounding area of the main body of the electronic apparatus and using the operation block, information for guiding the operator to a portion where the malfunction has occurred is not displayed on the LCD.

Therefore, the operator may not easily access the portion where the malfunction has been occurred. Consequently, resolution of the malfunction can be difficult.

The embodiments of the present invention have been developed under such circumstances. An objective of the embodiments is to provide an electronic apparatus that can display information corresponding to relative position information between an operation block being detached from a main body of the electronic apparatus and the main body of the electronic apparatus on a display unit of the operation block, in accordance with a condition of the main body of the electronic apparatus.

SUMMARY OF THE INVENTION

In one aspect, there is provided an electronic apparatus including a main body of the electronic apparatus; an operation unit including an operation block having a display unit, the operation block being detachable with respect to the main body of the electronic apparatus, and the operation block enabling at least a bidirectional wireless communication with the main body of the electronic apparatus; and a detection unit configured to detect relative positional information between the operation block and the main body of the electronic apparatus, when the operation block is detached from the main body of the electronic apparatus. The operation block being detached from the main body of the electronic apparatus is able to display information corresponding to the relative positional information on the display unit, in accordance with a condition of the main body of the electronic apparatus.

In another aspect, there is provided an information displaying method for an electronic apparatus including an operation unit having an operation block, the operation block being detachable with respect to a main body of the electronic apparatus, the operation block enabling, at least, a bidirectional wireless communication with the main body of the electronic apparatus, and the operation block including a display unit and an image input unit. The method includes a step for detecting relative positional information between the operation block and the main body of the electronic apparatus by inputting an image of a marked portion attached to the main body of the electronic apparatus using the image input unit of the operation block, when the operation block is detached from the main body of the electronic apparatus, and by analyzing data of the image being input; and a step for displaying information corresponding to the relative positional information on the display unit, in accordance with a condition of the main body of the electronic apparatus.

Other objects, features and advantages of the present invention will become more apparent from the following detailed description when read in conjunction with the accompanying drawings.

BRIEF DESCRIPTION OF THE DRAWINGS

FIG. 7A is a perspective view of the image forming apparatus in a state in which the display operation block is attached to the main body of the apparatus;

FIG. 7B is a plan view of the display operation block in the state in which the display operation block is attached to the main body of the apparatus;

FIG. 17B is a plan view of the display operation block in the state in which the display operation block is detached from the main body of the apparatus;

FIG. 19A is a perspective view of the image forming apparatus in a state in which the display operation block is detached from the main body of the apparatus;

FIG. 19B is a plan view of the display operation block in the state in which the display operation block is detached from the main body of the apparatus;

FIG. 20B is a plan view of the display operation block in the state in which the display operation block is detached from the main body of the apparatus;

DETAILED DESCRIPTION OF THE PREFERRED EMBODIMENTS

Figure 1:
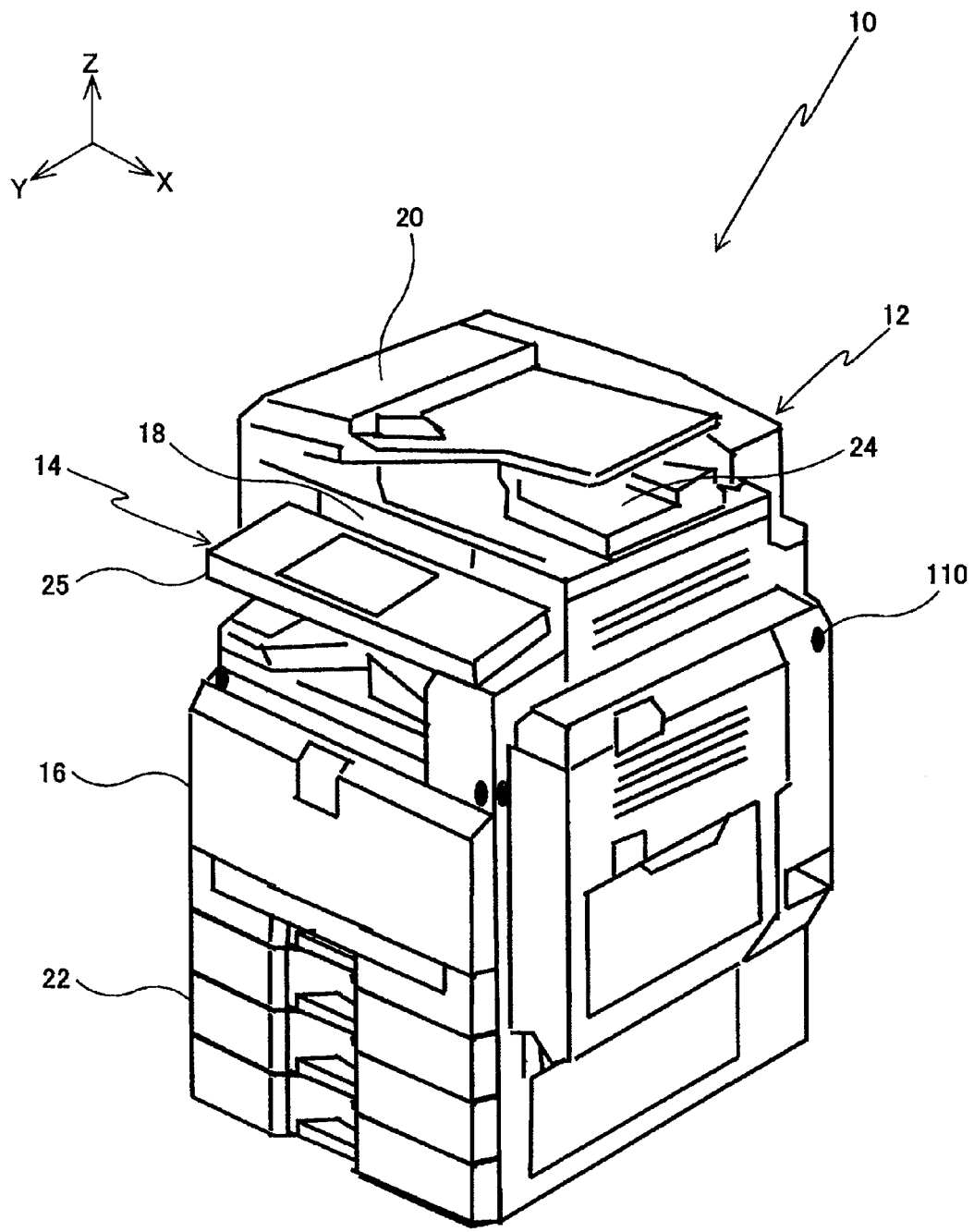
FIG. 1 is a perspective view schematically showing an external appearance of an image forming apparatus according to an embodiment.

Hereinafter, an embodiment of the present invention is explained based on FIGS. 1 through 20B. FIG. 1 is a perspective view schematically showing an external appearance of an image forming apparatus 10 as an electronic apparatus according to the embodiment. The image forming apparatus 10 is, for example, a copy machine, and as shown in FIG. 1, the image forming apparatus 10 includes a main body 12 of the apparatus 10 and an operation unit 14. Hereinafter, the image forming apparatus 10 is explained while setting a width direction of the image forming apparatus 10 to be an X-axis direction, a depth direction (a direction perpendicular to the X-axis direction in a horizontal surface) to be a Y-axis direction, and a direction perpendicular to the X-axis direction and the Y-axis direction to be a Z-axis direction.

Figure 6:
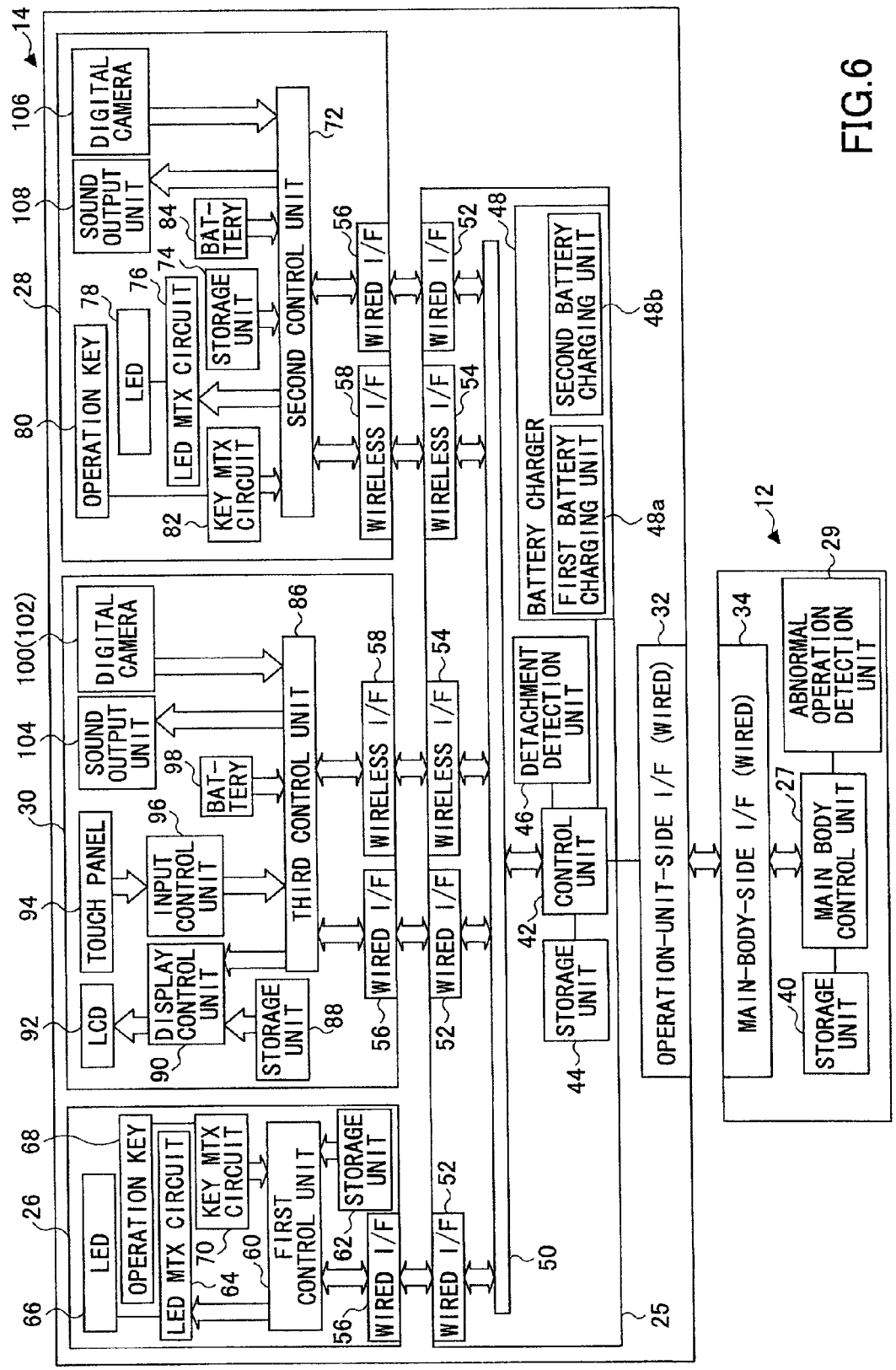
FIG. 6 is a block diagram illustrating a configuration of the operation unit.

The main body 12 of the apparatus 10 includes, at least, an image forming unit 16 for which a toner system is adopted; an image reading unit 18 including a scanner (not shown); an automatic document conveyance unit 20 that conveys a recording paper toward the image reading unit 18; a paper feeding unit 22 that feeds a recording paper to the image forming unit 16; a paper discharge unit 24 that discharges a recording paper on which an image is formed by the image forming unit 16; and a main body control unit 27 (cf. FIG. 6). Here, in the main body 12 of the apparatus 10, as shown in FIG. 1, the paper feeding unit 22, the image forming unit 16, the image reading unit 18, the paper discharge unit 24, and the automatic document conveyance unit 20 are arranged to be stacked from the bottom in this order. However, the arrangement is not limited to this.

The image forming unit 16 forms electrostatic latent images corresponding to an original image read by the image reading unit on plural (for example, four) photosensitive drums 16a (cf. FIG. 11), which are provided for corresponding colors. Further, the image forming unit 16 transfers toner images onto a recording paper through a transfer body (not shown). Here, the toner images are developed by adhering toner to the electrostatic latent images.

The image forming unit 16 conveys a recording paper fed from the paper feeding unit 22 to a transfer position where the toner images are transferred by the above described transfer body, for example, by a conveyance unit (not shown) including plural pairs of rollers. Then, as described above, the image forming unit 16 transfers the toner images onto the recording paper at the transfer position. After that, the recording paper, on which the toner images are transferred, is conveyed from the transfer position toward the paper discharge unit 24, for example, by a conveyance unit (not shown) including plural pairs of rollers.

The main body 12 includes various types of sensors, which are not shown in the figures. The main body 12 includes an abnormal operation detection unit 29 that detects an abnormal operation, such as a conveyance failure, e.g., a paper jam, at the image forming unit 16. The abnormal operation detection unit 29 detects not only an occurrence of an abnormal operation at the image forming unit 16, but also a position where the abnormal operation occurs.

Figure 2:
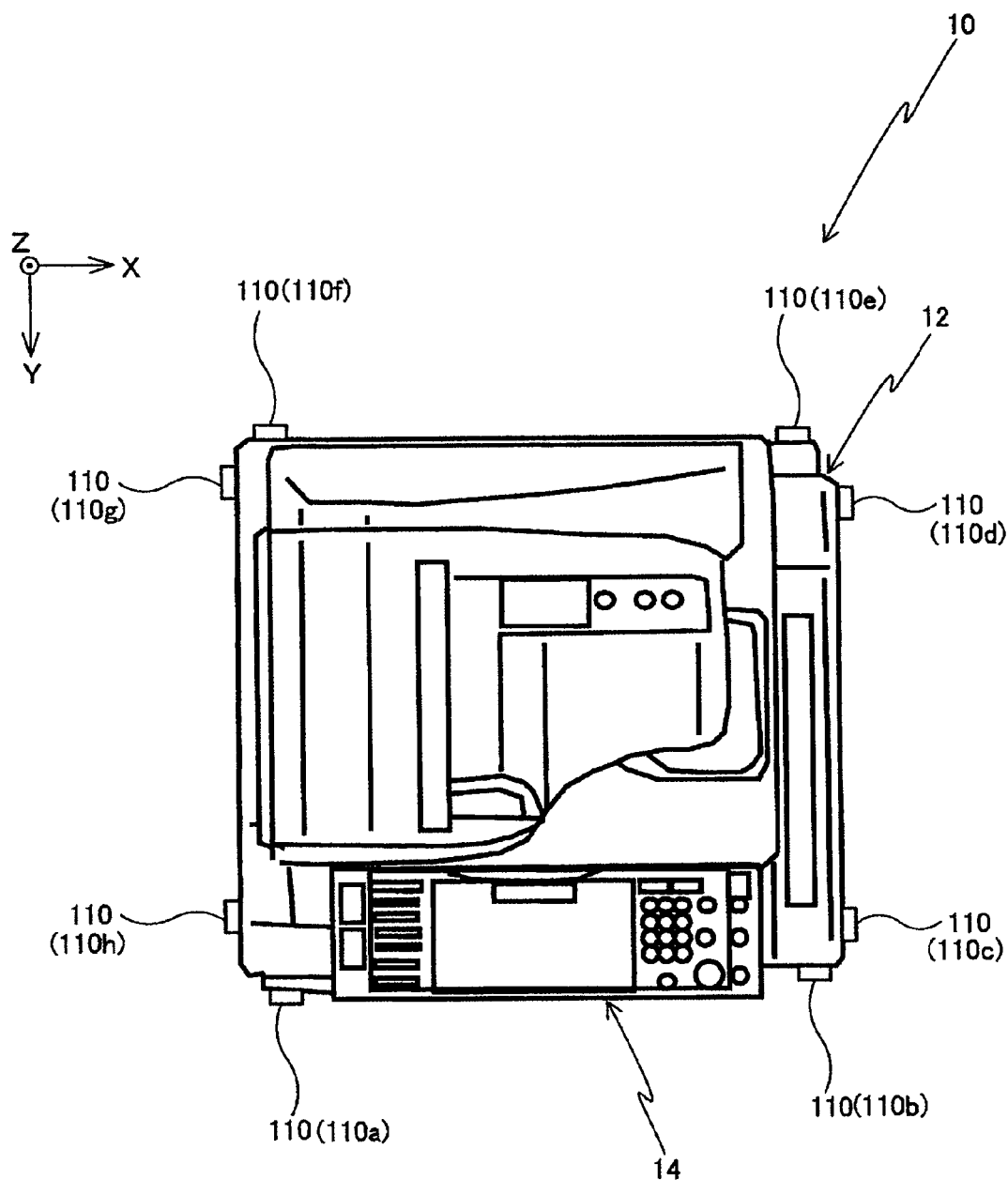
FIG. 2 is a plan view of the image forming apparatus.

As shown in FIGS. 1 and 2, for example, the operation unit 14 is arranged at a position at a side surface side in the positive Y-axis direction of an upper portion of the main body 12 (at a height almost equal to the height of the image reading unit 18).

Figure 3:
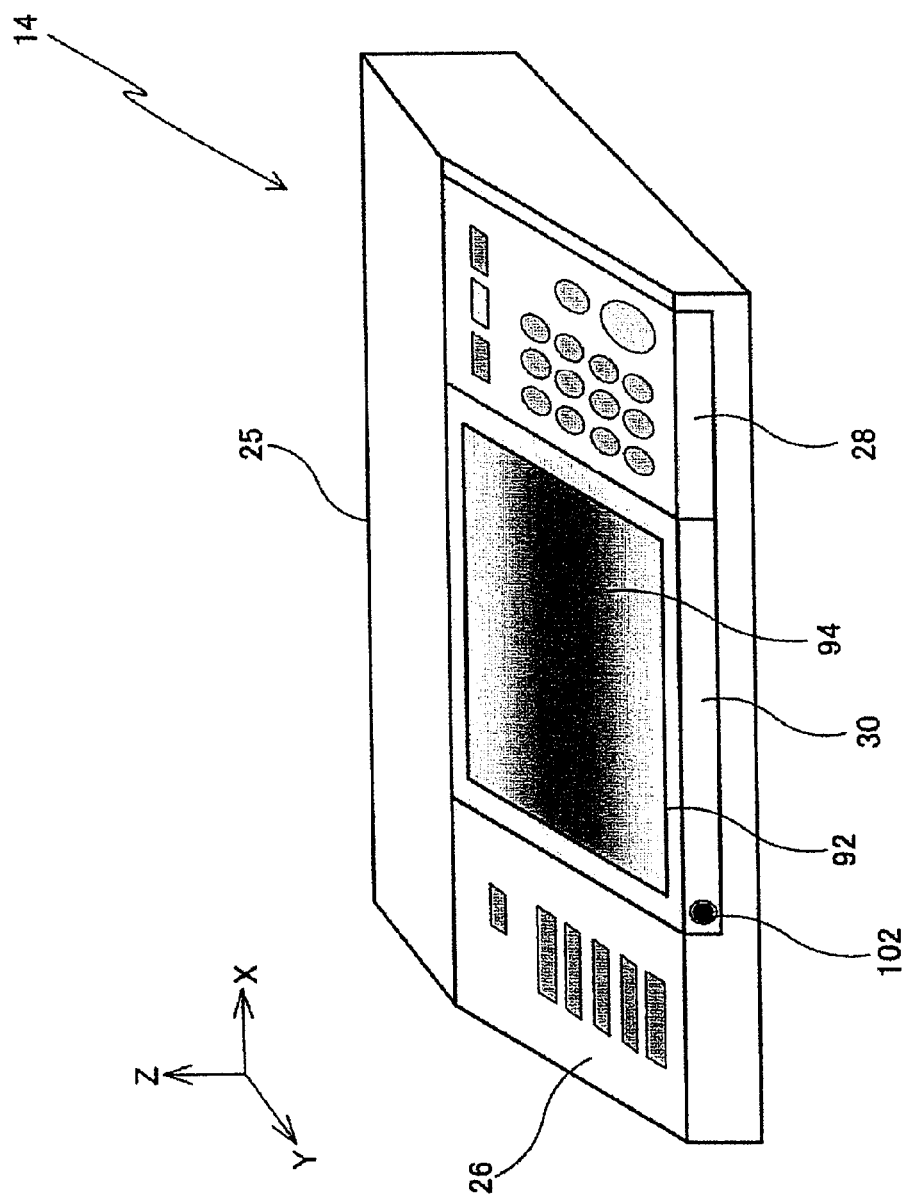
FIG. 3 is a perspective view showing an operation unit of the image forming apparatus.

FIG. 3 is a perspective view schematically showing an external appearance of the operation unit 14. As shown in FIG. 3, the operation unit 14 includes a base 25, a first operation block 26, a second operation block 28, a third operation block 30, and an operation-unit-side interface (I/F) 32 (cf. FIG. 6). The first operation block 26, the second operation block 28 and the third operation block 30 are neighboring to each other, and are arranged on the base 25. In FIG. 3, the first operation block 26, the third operation block 30, and the second operation block 28 are arranged in this order in the X-axis direction. However, the arrangement is not limited to this.

As shown in FIG. 1, the base 25 is integrally formed with the main body 12, while protruding in the Y-axis direction beyond the side surface in the positive Y-axis direction of the upper portion of the main body 12 (at the height almost equal to the height of the image reading unit 18).

Figure 4A:
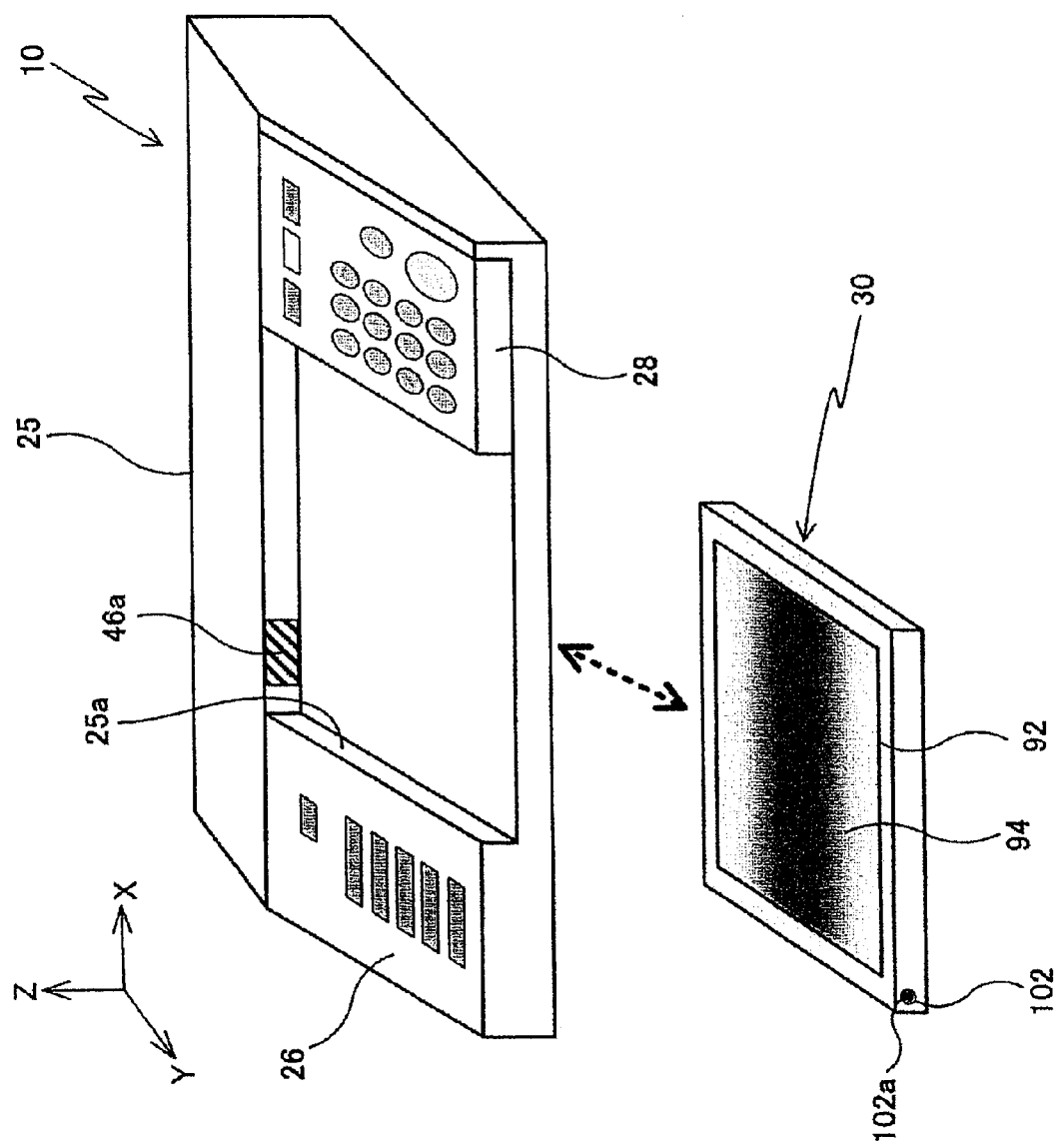
FIG. 4A is a perspective view showing the operation unit in a state in which a display operation block is detached from a base.
Figure 5:
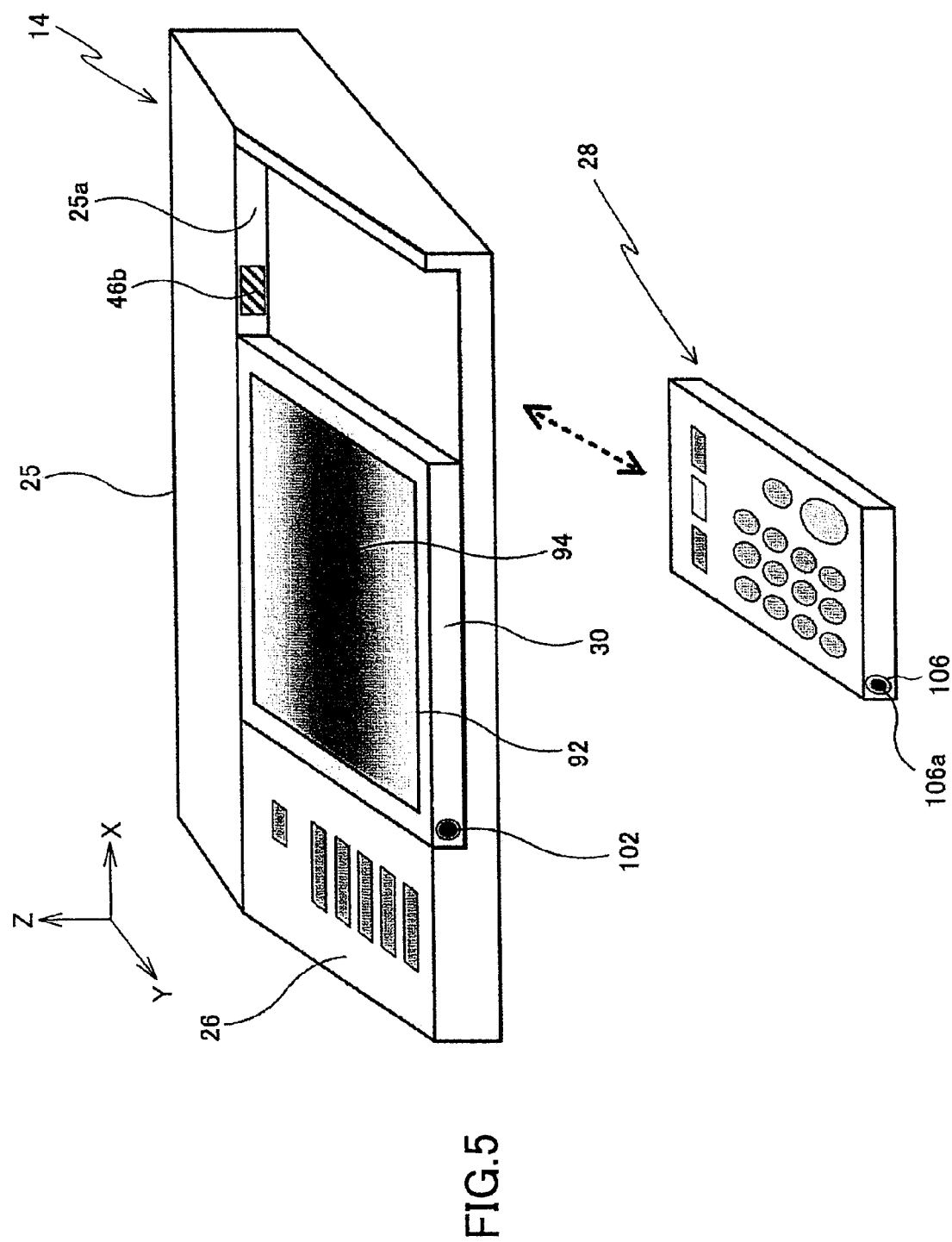
FIG. 5 is a perspective view showing the operation unit in a state in which a second operation block is detached from a main body of the apparatus.

As shown in FIG. 3, the first operation block 26 is integrally formed with the base 25, namely, the first operation block 26 is integrally formed with the main body 12 through the base 26. As shown in FIG. 5 and FIG. 4A, the second operation block 28 and the third operation block 30 are detachable with respect to the base 25, namely, the second operation block 28 and the third operation block 30 are detachable with respect to the main body 12 through the base 25. As shown in FIG. 4A, the third operation block 30 is attached to a side in the negative X-axis direction of a concave portion 25a, which is formed on the base 25 and which opens in the positive Z-axis direction and the positive Y-axis direction. As shown in FIG. 5, the second operation block 28 is attached to a side in the positive X-axis direction of the concave portion 25a. The first operation block 26 and the second operation block 28 have their own specific functions. When the third operation block 30 is attached to the base 25, the third operation block 30 has its own specific function. However, as described later, when the third operation block 30 is detached from the base 25, the third operation block 30 has all the specific functions of the first operation block 26, the second operation block 28, and the third operation block 30.

FIG. 6 shows schematically a configuration of the operation unit 14 and the like. As shown in FIG. 6, the main body control unit 27 is connected to the abnormal operation detection unit 29 and a storage unit 40 that stores various types of information. In addition, the main body control unit 27 is connected to a control unit 42 through a main-body-side interface 34 and the operation-unit-side interface 32 so as to enable a bidirectional communication.

The base 25 includes the control unit 42, a storage unit 44, a detachment detection unit 46, and a battery charger 48. Here, the storage unit 44, the detachment detection unit 46, and the battery charger 48 are connected to the control unit 42. The control unit 42, the storage unit 44, the detachment detection unit 46, and the battery charger 48 are placed inside the base 25.

The control unit 42 includes, at least, a central processing unit (CPU), a large-scale integrated circuit (LSI), and a digital signal processor (DSP). The control unit 42 is connected to wired interfaces 52 corresponding to the first operation block 26, the second operation block 28, and the third operation block 30, respectively, through a bus 50. In addition, the control unit 42 is connected to wireless interfaces 54 corresponding to the second operation block 28 and the third operation block 30, respectively, through the bus 50. On the other hand, the first operation block 26, the second operation block 28, and the third operation block 30 have wired interfaces 56 corresponding to the wired interfaces 52, respectively. Further, the second operation block 28 and the third operation block 30 have wireless interfaces 58 corresponding to the wireless interfaces 54, respectively.

The control unit 42 controls the first operation block 26, the second operation block 28, and the third operation block 30 based on signals output from the main body control unit 27. In addition, the control unit 42 analyzes signals output from the first operation block 26, the second operation block 28, and the third operation block 30, and transmits the signals to the main body control unit 27.

The detachment detection unit 46 includes, at least, an optical sensor 46a for the third operation block 30 and an optical sensor 46b for the second operation block 28 (cf. FIGS. 4A and 5). The optical sensor 46a detects whether the third operation block 30 is attached to the base 25 or not. The optical sensor 46b detects whether the second operation block 28 is attached to the base 25 or not. As shown in FIG. 4A, the optical sensor 46a is arranged in the vicinity of an end portion in the X-axis direction, which defines the concave portion 25a in the negative Y-axis direction formed on the base 25, while being exposed. On the other hand, as shown in FIG. 5, the optical sensor 46b is arranged in the vicinity of an end portion in the X-axis direction, which defines the concave portion 25a in the positive Y-axis direction formed on the base 25, while being exposed.

As shown in FIG. 6, the battery charger 48 includes a first battery charging unit 48a and a second battery charging unit 48b. When the detachment detection unit 46 detects that the second operation block 28 is attached to the base 25, the first battery charging unit 48a supplies electric power to the second operation block 28 in response to an instruction from the control unit 42. When the detachment detection unit 46 detects that the third operation block 30 is attached to the base 25, the second battery charging unit 48b supplies electric power to the third operation block 30 in response to an instruction from the control unit 42.

At least plural operation keys 68 for determining an application, such as copying, faxing, or printing, and a LED 66 are implemented on the first operation block 26. Further, the first operation block 26 includes a first control unit 60 including, at least, a CPU. The first operation block 26 operates in accordance with various programs stored in a storage unit 62 inside the first operation block 26. The first control unit 60 writes data onto the storage unit 62 and reads data in the storage unit 62. Further, the first control unit 60 controls a LED matrix (MTX) circuit 64 based on a signal from the base 25 through the wired interface 56, so as to control emissions of light from the LED 66 in accordance with, at least, copying, scanning, or printing in the image forming apparatus 10.

Further, when key information is requested from the base 25, the first control unit 60 analyzes an operational status of the plural operation keys 68 based on information output from a key matrix (MTX) circuit 70, and the first control unit 60 outputs the analyzing result to the control unit 42 of the base 25 as selection information.

At least plural operation keys 80, such as ten keys for inputting the number of copies, a start key for starting copying or printing, and a stop key for stopping copying or printing, and a LED 78 are implemented on the second operation block 28. Further, the second operation block 28 includes a second control unit 72 including, at least, a CPU. The second control unit 72 writes data onto a storage unit 74 and reads data in the storage unit 74. Further, the second control unit 72 controls a LED matrix (MTX) circuit 76 based on a signal from the base 25 through the wired interface 56 or the wireless interface 58, so as to control emissions of light from the LED 78 corresponding to the start key or the like.

Further, when key information is requested from the base 25, the second control unit 72 analyzes an operational status of the plural operation keys 80, such as the ten keys and an interruption key, based on information output from a key matrix (MTX) circuit 82, and the second control unit 72 outputs the analyzing result to the control unit 42 of the base 25 as selection information.

The second control unit 72 determines whether a battery 84 is to be used as a supply source of operating power for the operation block 28, based on a power state of the wired interface 56, and the second control unit 72 performs switching control for switching the supply source between the battery 84 and a power supply unit (not shown) of the main body 12. In addition, the second control unit 72 performs switching control for switching the wired interface 56 and the wireless interface 58, based on detection information from the detachment detection unit 46 through the control unit 42.

Specifically, when the second control unit 72 determines that the second operation block 28 is attached to the base 25 based on the detection information from the detachment detection unit 46 through the control unit 42, the second control unit 72 selects the wired interface 56 as a target of the communication. When the second control unit 72 determines that the second operation block 28 is not attached to the base 25 based on the detection information from the detachment detection unit 46, the second control unit 72 selects the wireless interface 58 as a target for the communication. On the other hand, when it is determined that the second operation block 28 is attached to the base 25 based on the detection information from the detachment detection unit 46, the control unit 42 selects the wired interface 52 as a target for the communication. When it is determined that the second operation block 28 is not attached to the base 25 based on the detection information from the detachment detection unit 46, the control unit 42 selects the wireless interface 54 as a target for the communication.

Namely, when the second operation block 28 is detached from the main body 12, the communication mode between the operation block 28 and the base 25 is switched from the wired communication to the wireless communication. Thus the operation block 28 is in a state in which the operation block 28 can remotely control the main body 12.

At least a liquid crystal display (LCD) as a display device and a touch panel 94 as an input device attached to the LCD 92, such as an infrared type touch panel, are implemented on the third operation block 30. Further, the third operation block 30 includes a third control unit 86 including, at least, a CPU. The third operation block 30 operates in accordance with various programs stored in the third operation block 30. The third control unit 86 writes data onto a storage unit 88 and reads data in the storage unit 88. Further, the third control unit 86 controls a display control unit 90 based on a signal from the base 25 through the wired interface 56 or the wireless interface 58, so as to select, at least, various information stored in the storage unit 88 and/or various information from the base 25, and to cause the LCD 92 to display the selected information. As described above, since the third operation block 30 has the function to display information, hereinafter, the third operation block 30 is also referred to as a display operation block 30. For the display operation block 30, the same reference numeral is used.

Further, when the control unit 42 requests positional information on the touch panel 94, the third control unit 86 transmits the positional information on the touch panel 94 from an input control unit 96 to the control unit 42 as the selected information. In the embodiment, the LCD 92 and the touch panel 94 are formed to be overlapped. The LCD 92 is controlled by the display control unit 90, and the LCD 92 displays information in accordance with an instruction from the third control unit 86. The pressing position on the touch panel 94 is detected by the input control unit 96 as a coordinate position on the display surface of the LCD 92, and the input control unit 96 outputs touch panel positional information indicating the detected coordinate position to the third control unit 86.

The third control unit 86 determines whether a battery 98 is used as a supply source of operating power for the display operation block 30, based on a power state of the wired interface 56, and the third control unit 86 performs switching control for switching the supply source between the battery 98 and a power supply unit (not shown) of the main body 12. In addition, the third control unit 86 performs switching control for switching the wired interface 56 and the wireless interface 58, based on an instruction from the control unit 42.

Specifically, when the third control unit 86 determines that the display operation block 30 is attached to the base 25 based on the detection information from the detachment detection unit 46 through the control unit 42, the third control unit 86 selects the wired interface 56 as a target of the communication. When the third control unit 86 determines that the display operation block 30 is not attached to the base 25 based on the detection information from the detachment detection unit 46, the third control unit 86 selects the wireless interface 58 as a target for the communication. On the other hand, when it is determined that the display operation block 30 is attached to the base 25 based on the detection information from the detachment detection unit 46, the control unit 42 selects the wired interface 52 as a target for the communication. When it is determined that the display operation block 30 is not attached to the base 25 based on the detection information from the detachment detection unit 46, the control unit 42 selects the wireless interface 54 as a target for the communication.

Namely, when the display operation block 30 is detached from the main body 12, the communication mode between the display operation block 30 and the base 25 is switched from the wired communication to the wireless communication. Thus the display operation block 30 is in a state in which the display operation block 30 can remotely control the main body 12.

When the display operation block 30 and the second operation block 28 are attached to the main body 12 through the base 25 (cf. FIG. 7A), contents of usual operations for realizing the functions specific to the display operation block 30 (e.g., operation selection items) are displayed on the LCD (cf. FIG. 7B). Further, when only the second operation block 28 is detached from the main body 12, in addition to the contents of the usual operations, contents of operations for realizing the functions specific to the second operation block 28 (e.g., operation selection items) may be displayed on the display operation block 30 attached to the base 25. With such a configuration, the functions specific to the second operation block 28 may be realized by using the display operation block 30 attached to the main body 12, without using the second operation block 28.

Figure 8A:
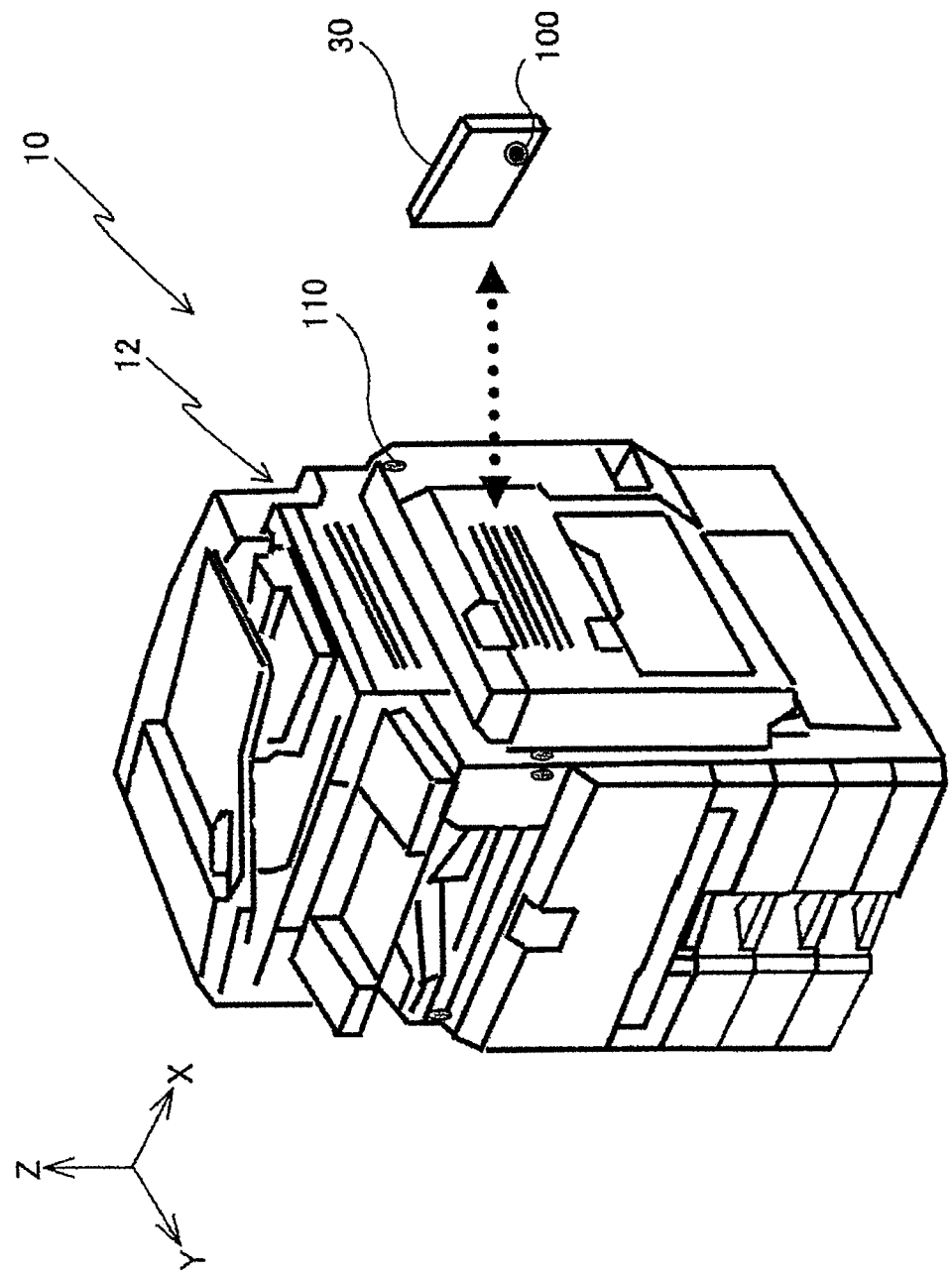
FIG. 8A is a perspective view of the image forming apparatus in a state in which the display operation block is detached from the main body of the apparatus.
Figure 8B:
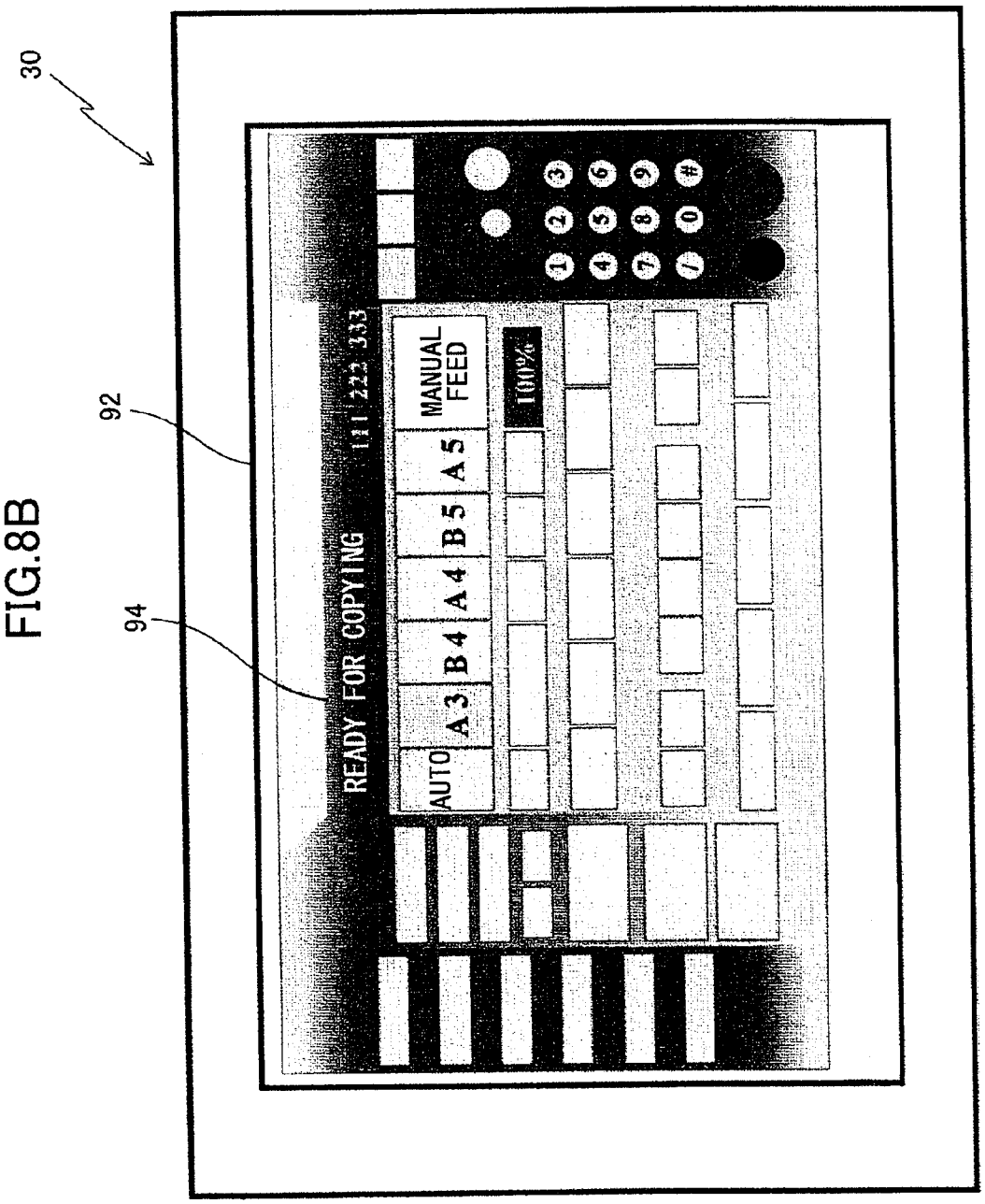
FIG. 8B is a plan view of the display operation block in the state in which the display operation block is detached from the main body of the apparatus.
Figure 9:
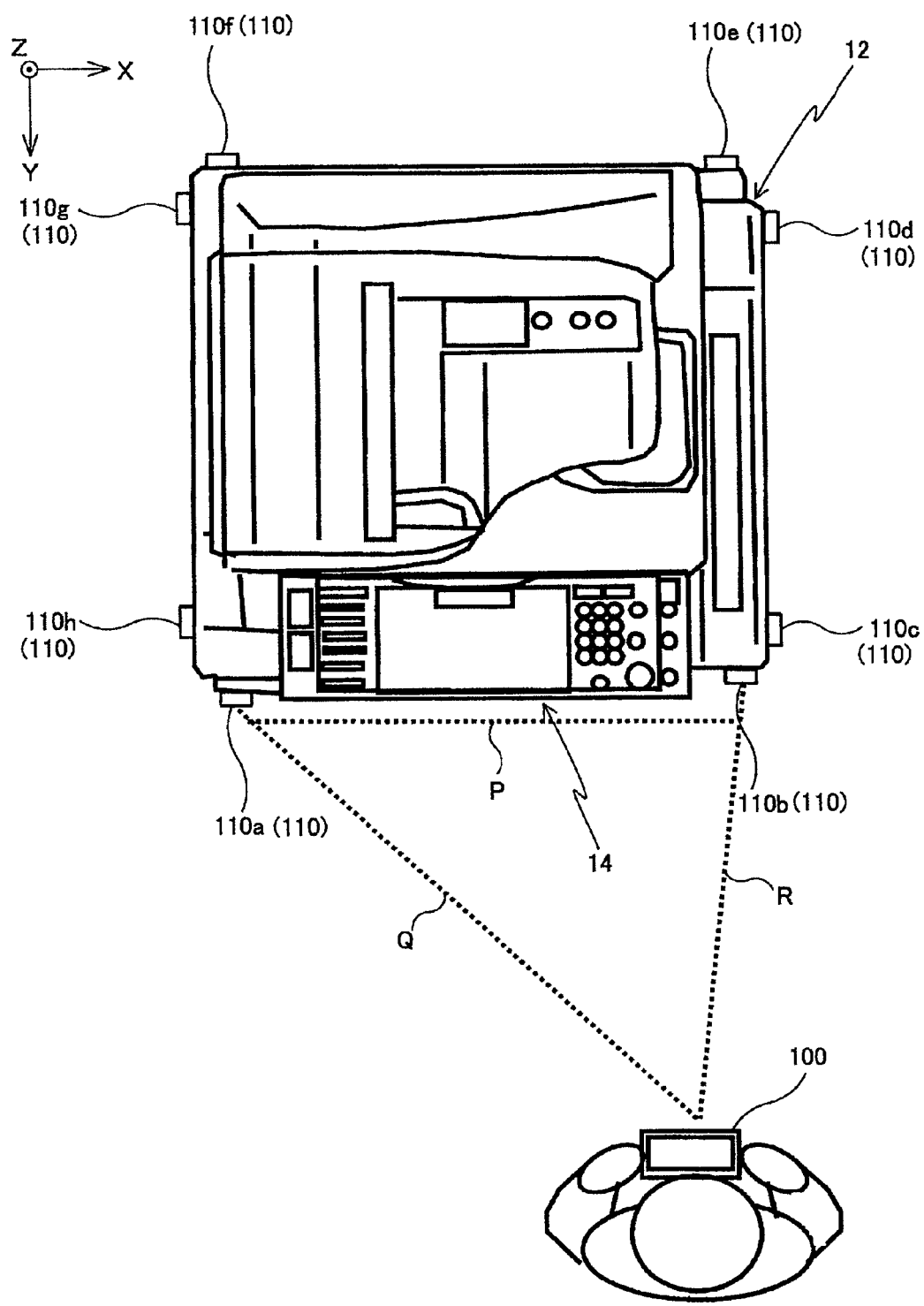
FIG. 9 is a plan view illustrating a state in which the main body of the apparatus is photographed from a front side of the main body of the apparatus using a digital camera of the display operation block.

Further, when the display operation block 30 is detached from the main body 12 (cf. FIG. 8A), in addition to the contents of the usual operations of the display operation block 30, contents for realizing the functions specific to the first operation block 26 and the contents for realizing the functions specific to the second operation block 28 (e.g., operation selection items) are displayed on the LCD 92 (cf. FIG. 8B). Namely, the display operation block 30 displays the contents of all the operations of the operation unit 14, and with the contents, all the operations of the operation unit 14 can be performed using the display operation block 30.

Figure 4B:
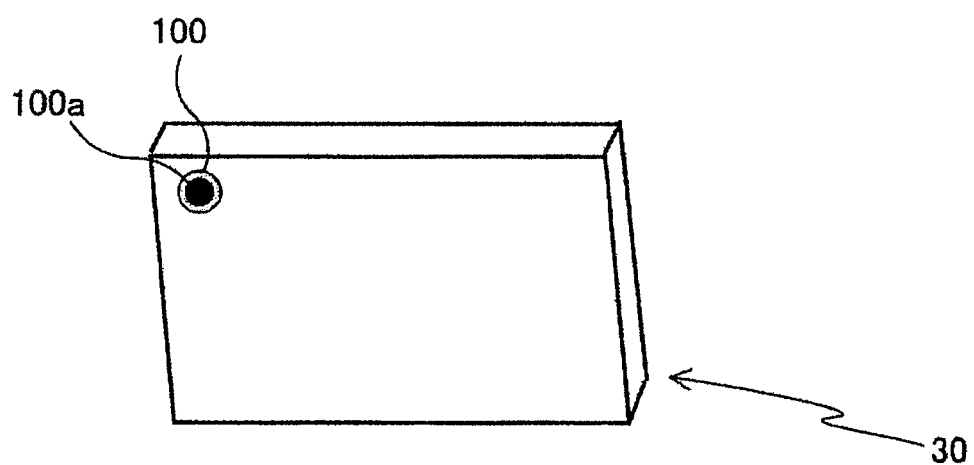
FIG. 4B is a perspective view of the display operation block viewed from a rear side, the display operation block being detached from the base.

Here, as shown in FIGS. 4A and 4B, the display operation block 30 includes compact digital cameras 100 and 102. As shown in FIG. 4B, the digital camera 100 is fixed inside the display operation block 30, so that a lens 100*a* of the digital camera 100 is exposed on the rear surface of the display operation block 30 (the surface opposite to the display surface of the LCD 92). The digital camera 102 is fixed inside the display operation block 30, so that a lens 102*a* of the digital camera 102 is exposed on one of side surfaces (the side surface at the positive Y-axis direction in FIG. 4A) of the display operation block.

An image of a photographic subject is input to the digital camera 100 through the lens 100*a*. The digital camera 100 transmits data of the input image to the third control unit 86. Similarly, an image of a photographic subject is input to the digital camera 102 through the lens 102*a*. The digital camera 102 transmits data of the input image to the third control unit 86.

The digital cameras 100 and 102 are selectively used. When the display operation block 30 is detached from the base 25, the selected digital camera automatically starts photographing. Specifically, the third control unit 86 usually selects the digital camera 100. In an emergency in which a trouble occurs in the digital camera 100, the third control unit 86 selects the digital camera 102. Further, when the display operation block 30 is detached from the base 25, the third control unit 86 causes the digital camera 100 or the digital camera 102 to start photographing, based on the detection information from the detachment detection unit 46 through the control unit 42. Hereinafter, the digital camera 100 is assumed to be selected in the display operation block 30, and the embodiment is explained.

Further, as shown in FIG. 6, a sound output unit 104 including, for example, a buzzer or a speaker, is included inside the display operation block 30. For example, when an abnormal operation occurs in the image forming unit 16 and a detection signal for detecting the abnormal operation is transmitted from the abnormal operation detection unit 29 to the third control unit 86 through the main body control unit 27 and the control unit 42, the sound output unit 104 outputs a warning sound, whose data is stored (saved) in a built-in memory (not shown) in the third control unit 86 in advance, in response to an instruction from the third control unit 86, and draws a user's attention.

As shown in FIG. 5, a compact digital camera 106 is included inside the second operation block 28. The digital camera 106 is fixed inside the second operation block 28, so that a lens 106a of the digital camera 106 is exposed on a side surface of the second operation block 28 (the side surface in the positive Y-axis direction in FIG. 5).

An image of a photographic subject is input to the digital camera 106 through the lens 106a. The digital camera 106 transmits data of the input image to the second control unit 72.

Further, as shown in FIG. 6, a sound output unit 108 including, for example, a buzzer or a speaker, is included inside the second operation block 28. For example, when an abnormal operation occurs in the image forming unit 16 and a detection signal for detecting the abnormal operation is transmitted from the abnormal operation detection unit 29 to the second control unit 72 through the main body control unit 27 and the control unit 42, the sound output unit 108 outputs a warning sound, whose data is stored (saved) in a memory (not shown) in the second control unit 72 in advance, in response to an instruction from the second control unit 72, and draws a user's attention.

Incidentally, as shown in FIG. 2, the main body 12 has a substantially rectangular shape in plan view, and on each of the side surfaces of the main body 12 in the positive X-axis direction, in the negative X-axis direction, in the positive Y-axis direction, and in the negative Y-axis direction, plural (for example, two) marked portions are fixed.

External appearances of the plural (for example, eight) marked portions 110 are different to each other. Namely, as shown in FIGS. 9-12, for each marked portion 110, a member having a flat board shape is used such that at least one of a shape, a color, and a pattern of the member is different from corresponding shapes, colors, and patterns of members used for other marked portions 110. Therefore, when one of the marked portions 110 is within a photographing field of view of any one of the digital cameras 100, 102, and 106, an image of the one of the marked portion 100 is recognized to be different from images of other marked portions 100.

The third control unit 86 obtains relative positional information between the display operation block 30 and the main body 12 by analyzing data of the images of the marked portions 110, which have been input by the digital camera 100 or the digital camera 102. Here, positional information of the marked portions 100 with respect to the main body 12, distance information between the marked portions 100, focal length information and photographing magnification information of the digital cameras 100 and 102 are assumed to be stored in the built-in memory (not shown) in the third control unit 86 in advance.

Namely, a detection unit that detects the relative positional information between the display operation block 30 and the main body 12 is formed by the digital camera 100, the plural marked portions 110, and the third control unit 86, or the digital camera 102, the plural marked portions 110, and the third control unit 86.

Here, as shown in FIG. 2, the marked portions 110 arranged at a first end portion in the negative X-axis direction and a second end portion in the positive X-axis direction on the side surface in the positive Y-axis direction of the main body 12 are also referred to as a first marked portion 110a and a second marked portion 110b, respectively. The marked portions 110 arranged at a third end portion in the positive Y-axis direction and a fourth end portion in the negative Y-axis direction on the side surface in the positive X-axis direction of the main body 12 are also referred to as a third marked portion 110c and a fourth marked portion 110d, respectively. The marked portions 110 arranged at a fifth end portion in the positive X-axis direction and a sixth end portion in the negative X-axis direction on the side surface in the negative Y-axis direction of the main body 12 are also referred to as a fifth marked portion 110e and a sixth marked portion 110f, respectively. The marked portions 110 arranged at a seventh end portion in the negative Y-axis direction and a eighth end portion in the positive Y-axis direction on the side surface in the negative X-axis direction of the main body 12 are also referred to as a seventh marked portion 110g and a eighth marked portion 110h, respectively. The first through eighth marked portions 110a-110h are arranged at intermediate positions of the main body 12 with respect to the Z-axis.

As described above, since pairs of the marked portions 110 are placed on corresponding side surfaces of the main body 12 in the positive X-axis direction, in the negative X-axis direction, in the positive Y-axis direction, and in the negative Y-axis direction, while each pair of the marked portions are spaced apart in substantially horizontal direction, when a user, a maintenance personnel or the like (hereinafter, referred to as a user or the like) has the display operation block 30, the user or the like can take a picture including at least two of the first through eighth marked portions 110a-110h with the digital camera 100 or the digital camera 102 from an arbitrary position around the main body 12.

When an image including at least two marked portions 110 of the first through eighth marked portions 110a-110h is input by the digital camera 100 or the digital camera 102, the third control unit 86 obtains the relative positional information between the display operation block 30 and the main body 12 based on information such as the spacing of the marked portions photographed by the digital camera 100 or the digital camera 102, sizes of the marked portions photographed by the digital camera 100 or the digital camera 102, or an angle of the photographing.

Figure 10:
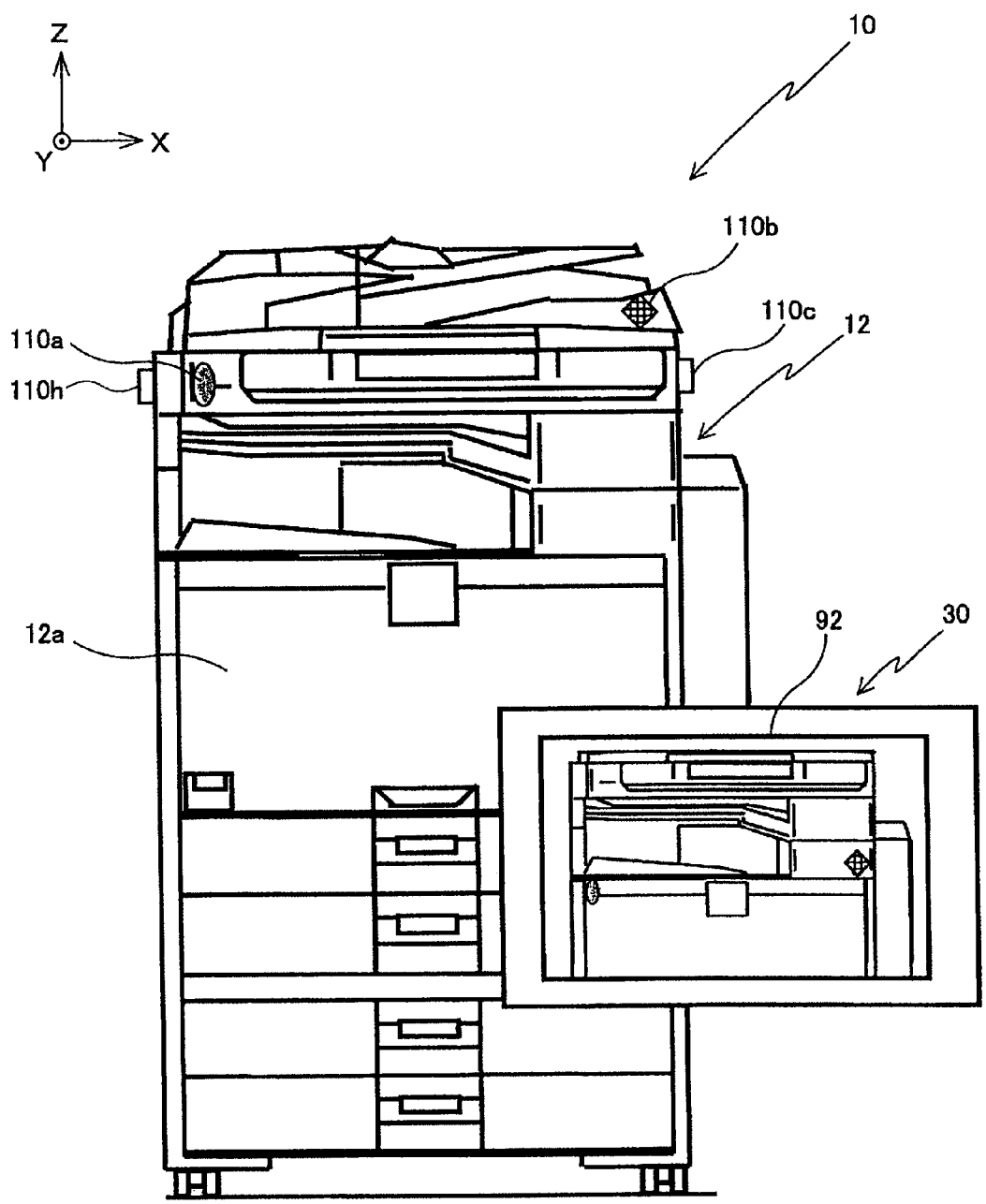
FIG. 10 is a side view illustrating the state in which the main body of the apparatus is photographed from the front side of the main body of the apparatus using the digital camera of the display operation block.

Specifically, for example, as shown in FIG. 10, when an image including, at least, the first marked portion 110a and the second marked portion 110b is input by the digital camera 100, the third control unit 86 determines that the display operation block 30 is located at a side in the positive Y-axis direction of the main body 12. Further, the third control unit 86 calculates a distance Q between the digital camera 100 and the first marked portion 110a and a distance R between the digital camera 100 and the second marked portion 110b based on information, such as a distance P between the first marked portion 110a and the second marked portion 110b, sizes of the first marked portion 110a and the second marked portion 110*b* within the photographing field of view, and the angle of the photographing. In this manner, the relative positional information between the display operation block 30 and the main body 12 can be accurately obtained.

Further, when an image including, at least, the second marked portion 110*b* and the third marked portion 110*c* is input by the digital camera 100, the third control unit 86 determines that the display operation block 30 is located at a position facing a corner portion in the positive Y-axis side and in the positive X-axis side. Further, the third control unit 86 calculates a distance between the digital camera 100 and the second marked portion 110*b* and a distance between the digital camera 100 and the third marked portion 110*c* based on information, such as a distance between the second marked portion 110*b* and the third marked portion 110*c*, sizes of the second marked portion 110*b* and the third marked portion 110*c* within the photographing field of view, and the angle of the photographing. In this manner, the relative positional information between the display operation block 30 and the main body 12 can be accurately obtained.

Further, when an image including, at least, the third marked portion 110*c* and the fourth marked portion 110*d* is input by the digital camera 100, the third control unit 86 determines that the display operation block 30 is located at a side in the positive X-axis direction of the main body 12. Further, the third control unit 86 calculates a distance between the digital camera 100 and the third marked portion 110*c* and a distance between the digital camera 100 and the fourth marked portion 110*d* based on information, such as a distance between the third marked portion 110*c* and the fourth marked portion 110*d*, sizes of the third marked portion 110*c* and the fourth marked portion 110*d* within the photographing field of view, and the angle of the photographing. In this manner, the relative positional information between the display operation block 30 and the main body 12 can be accurately obtained.

Further, when an image including, at least, the fourth marked portion 110*d* and the fifth marked portion 110*e* is input by the digital camera 100, the third control unit 86 determines that the display operation block 30 is located at a position facing a corner portion in the positive X-axis side and in the negative Y-axis side. Further, the third control unit 86 calculates a distance between the digital camera 100 and the fourth marked portion 110*d* and a distance between the digital camera 100 and the fifth marked portion 110*e* based on information, such as a distance between the fourth marked portion 110*d* and the fifth marked portion 110*e*, sizes of the fourth marked portion 110*d* and the fifth marked portion 110*e* within the photographing field of view, and the angle of the photographing. In this manner, the relative positional information between the display operation block 30 and the main body 12 can be accurately obtained.

Further, when an image including, at least, the fifth marked portion 110*e* and the sixth marked portion 110*f* is input by the digital camera 100, the third control unit 86 determines that the display operation block 30 is located at a side in the negative Y-axis direction of the main body 12. Further, the third control unit 86 calculates a distance between the digital camera 100 and the fifth marked portion 110*e* and a distance between the digital camera 100 and the sixth marked portion 110*f* based on information, such as a distance between the fifth marked portion 110*e* and the sixth marked portion 110*f*, sizes of the fifth marked portion 110*e* and the sixth marked portion 110*f* within the photographing field of view, and the angle of the photographing. In this manner, the relative positional information between the display operation block 30 and the main body 12 can be accurately obtained.

Further, when an image including, at least, the sixth marked portion 110*f* and the seventh marked portion 110*g* is input by the digital camera 100, the third control unit 86 determines that the display operation block 30 is located at a position facing a corner portion in the negative Y-axis side and in the negative X-axis side. Further, the third control unit 86 calculates a distance between the digital camera 100 and the sixth marked portion 110*f* and a distance between the digital camera 100 and the seventh marked portion 110*g* based on information, such as a distance between the sixth marked portion 110*f* and the seventh marked portion 110*g*, sizes of the sixth marked portion 110*f* and the seventh marked portion 110*g* within the photographing field of view, and the angle of the photographing. In this manner, the relative positional information between the display operation block 30 and the main body 12 can be accurately obtained.

Further, when an image including, at least, the seventh marked portion 110*g* and the eighth marked portion 110*h* is input by the digital camera 100, the third control unit 86 determines that the display operation block 30 is located at a side in the negative X-axis direction of the main body 12. Further, the third control unit 86 calculates a distance between the digital camera 100 and the seventh marked portion 110*g* and a distance between the digital camera 100 and the eighth marked portion 110*h* based on information, such as a distance between the seventh marked portion 110*g* and the eighth marked portion 110*h*, sizes of the seventh marked portion 110*g* and the eighth marked portion 110*h* within the photographing field of view, and the angle of the photographing. In this manner, the relative positional information between the display operation block 30 and the main body 12 can be accurately obtained.

Further, when an image including, at least, the eighth marked portion 110*f* and the first marked portion 110*a* is input by the digital camera 100, the third control unit 86 determines that the display operation block 30 is located at a position facing a corner portion in the negative X-axis side and in the positive Y-axis side. Further, the third control unit 86 calculates a distance between the digital camera 100 and the eighth marked portion 110*h* and a distance between the digital camera 100 and the first marked portion 110*a* based on information, such as a distance between the eighth marked portion 110*h* and the first marked portion 110*a*, sizes of the eighth marked portion 110*h* and the first marked portion 110*a* within the photographing field of view, and the angle of the photographing. In this manner, the relative positional information between the display operation block 30 and the main body 12 can be accurately obtained.

Here, if more than or equal to three of the marked portions 110 can be simultaneously photographed by the digital camera 100, by placing the display operation block 30, for example, at the corner portion in the positive X-axis side and in the positive Y-axis side, at the corner portion in the positive X-axis side and in the negative Y-axis side, at the corner portion in the negative X-axis side and in the positive Y-axis side, or at the corner portion in the negative X-axis side and in the negative Y-axis side, the relative positional information between the display operation block 30 and the main body 12 can be more accurately obtained.

Further, when the marked portion 110 is photographed by the digital camera 100, it is not always necessary to photograph the entirety of the marked portion 110, and a portion of the marked portion 110 may be photographed. Namely, for example, a portion of the marked portion 110 which includes the center of the gravity of the marked portion 110 may be photographed by the digital camera 100, or only an edge portion of the marked portion 110 may be photographed by the digital camera 100.

Figure 15:
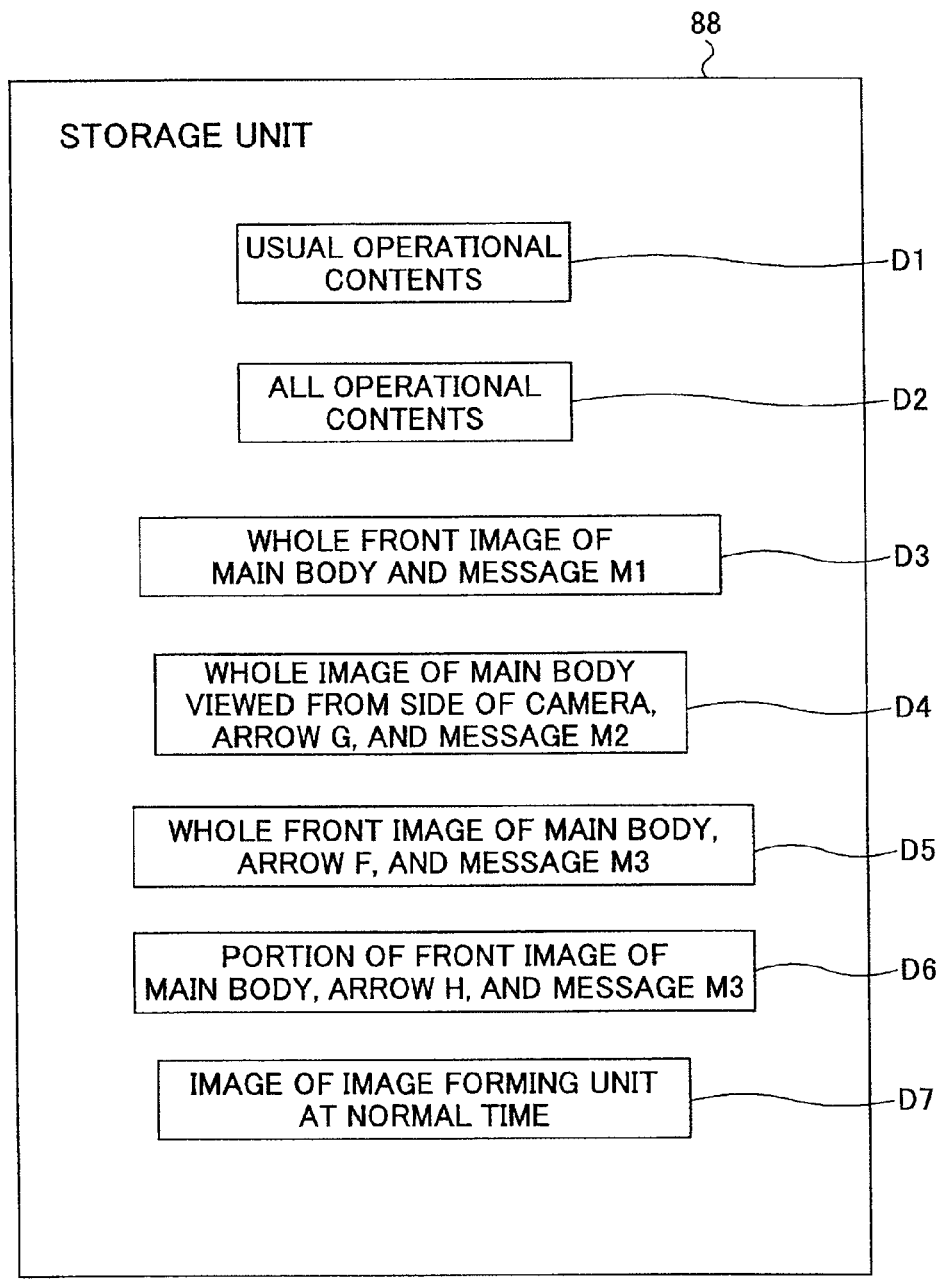
FIG. 15 is a diagram showing contents of data stored in a storage unit of the display operation block.
Figure 16A:
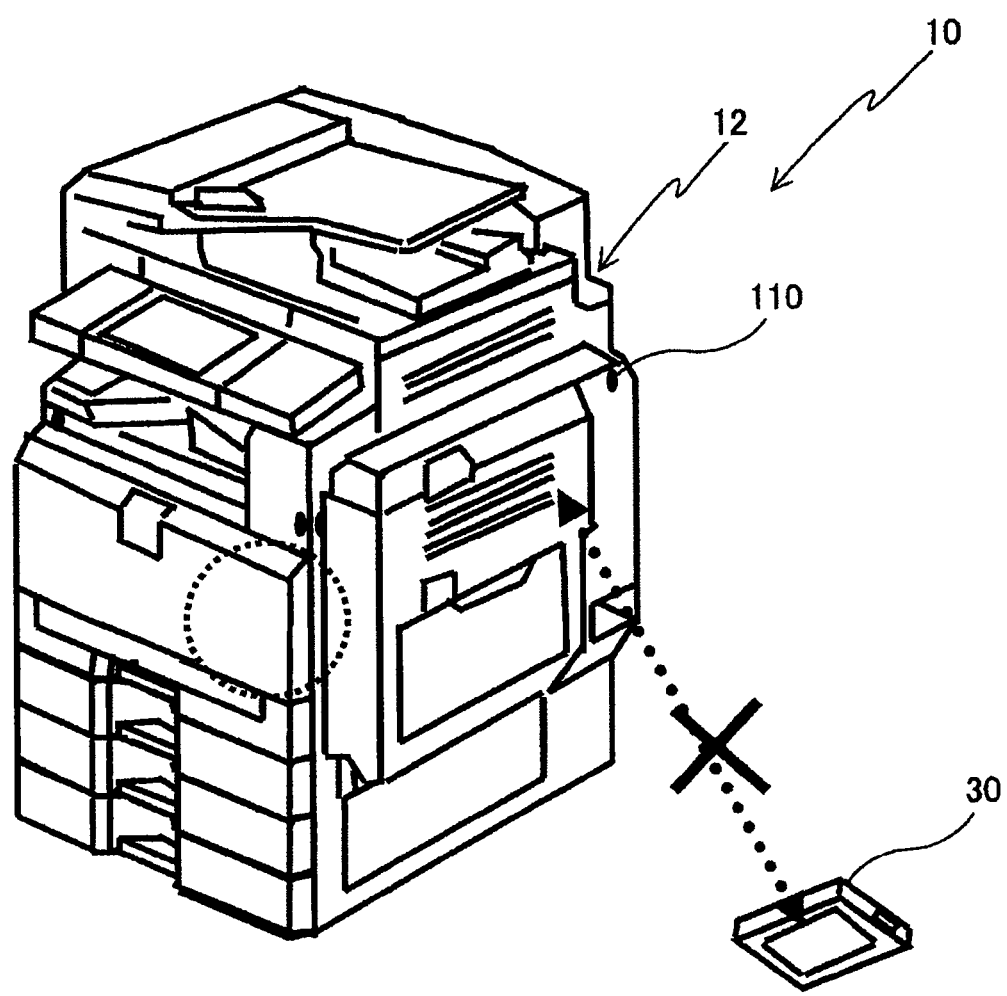
FIG. 16A is a perspective view of the image forming apparatus in a state in which the display operation block is detached from the main body of the apparatus.
Figure 16B:
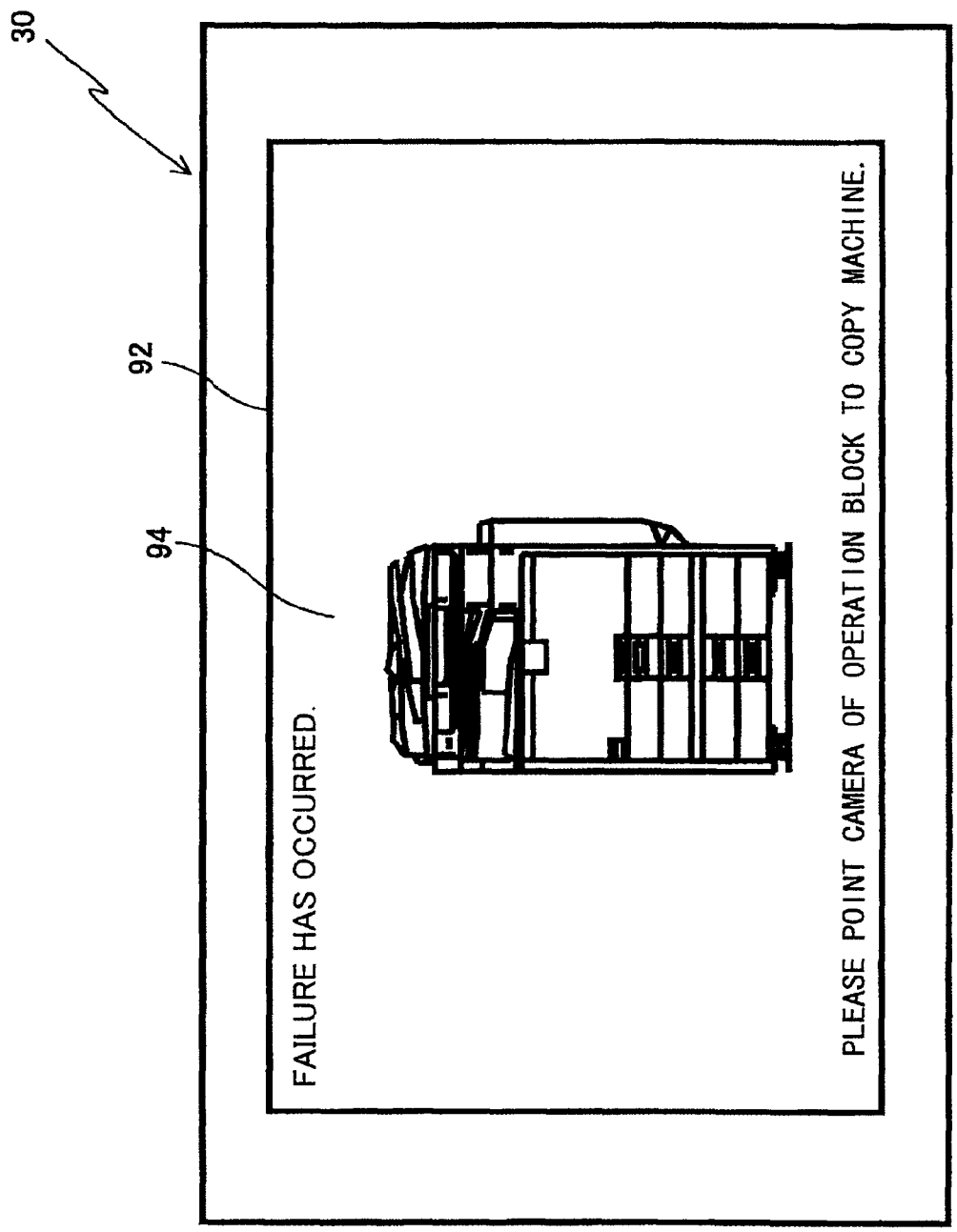
FIG. 16B is a plan view of the display operation block in the state in which the display operation block is detached from the main body of the apparatus.
Figure 17A:
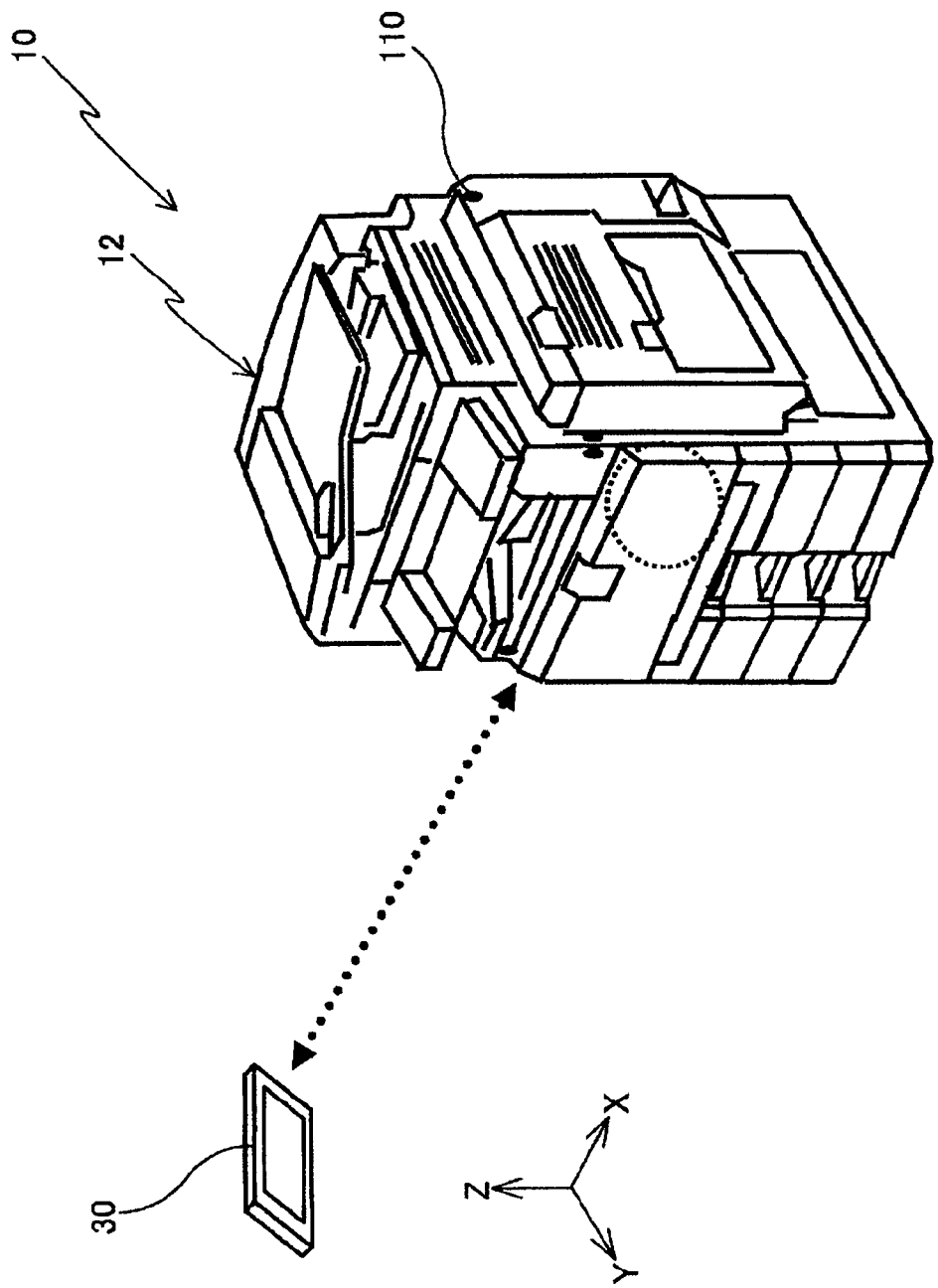
FIG. 17A is a perspective view of the image forming apparatus in a state in which the display operation block is detached from the main body of the apparatus.
Figure 18A:
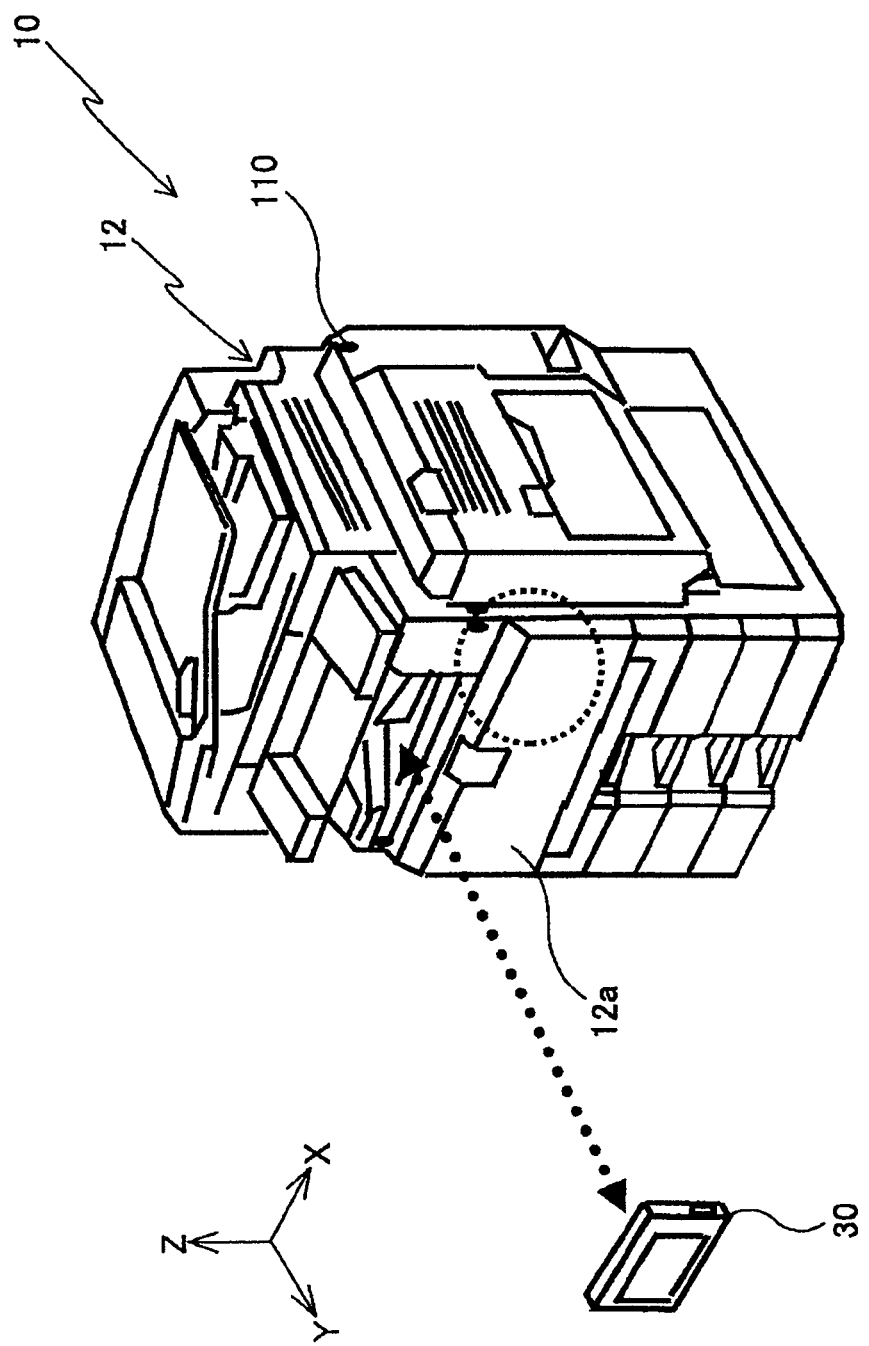
FIG. 18A is a perspective view of the image forming apparatus in a state in which the display operation block is detached from the main body of the apparatus.
Figure 18B:
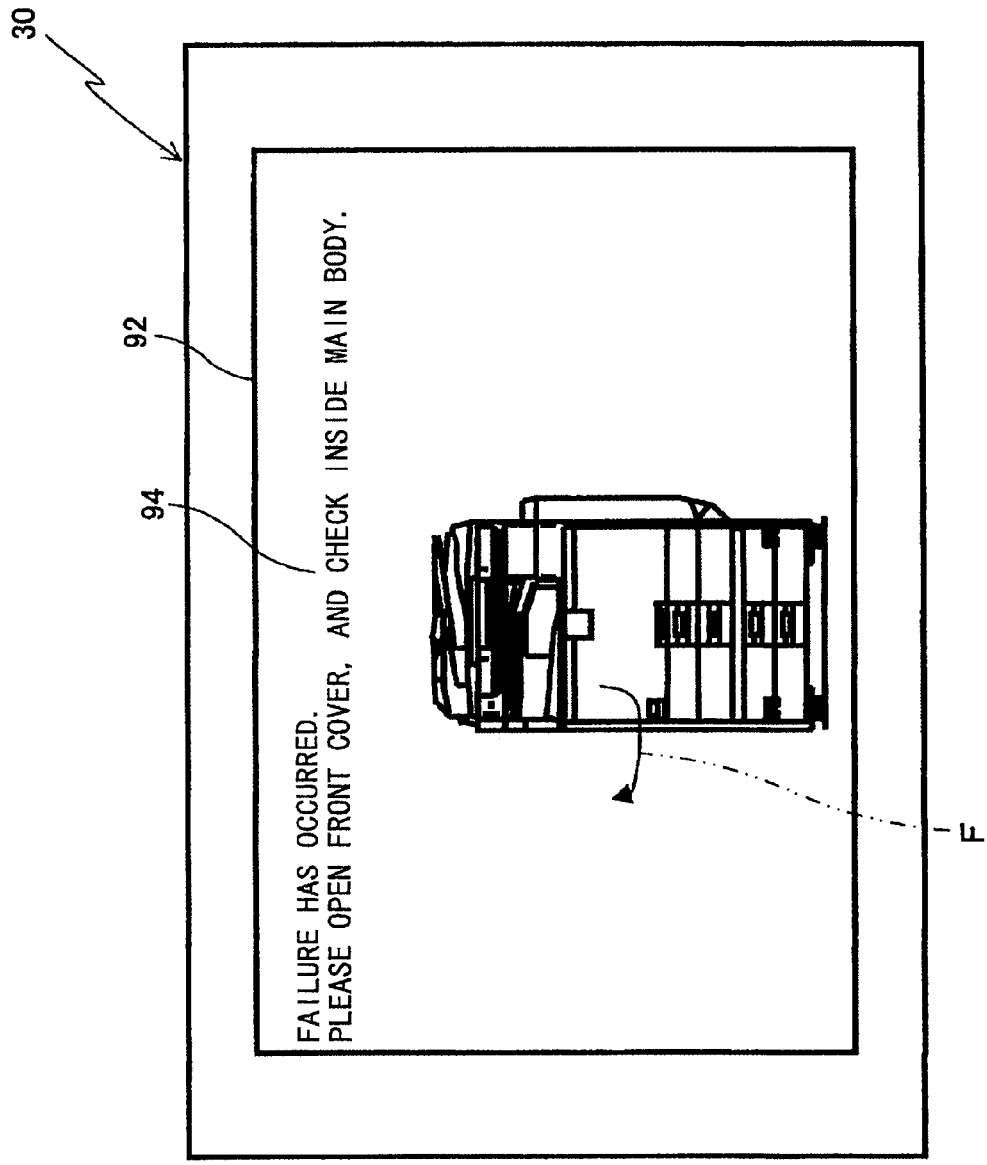
FIG. 18B is a plan view of the display operation block in the state in which the display operation block is detached from the main body of the apparatus.
Figure 20A:
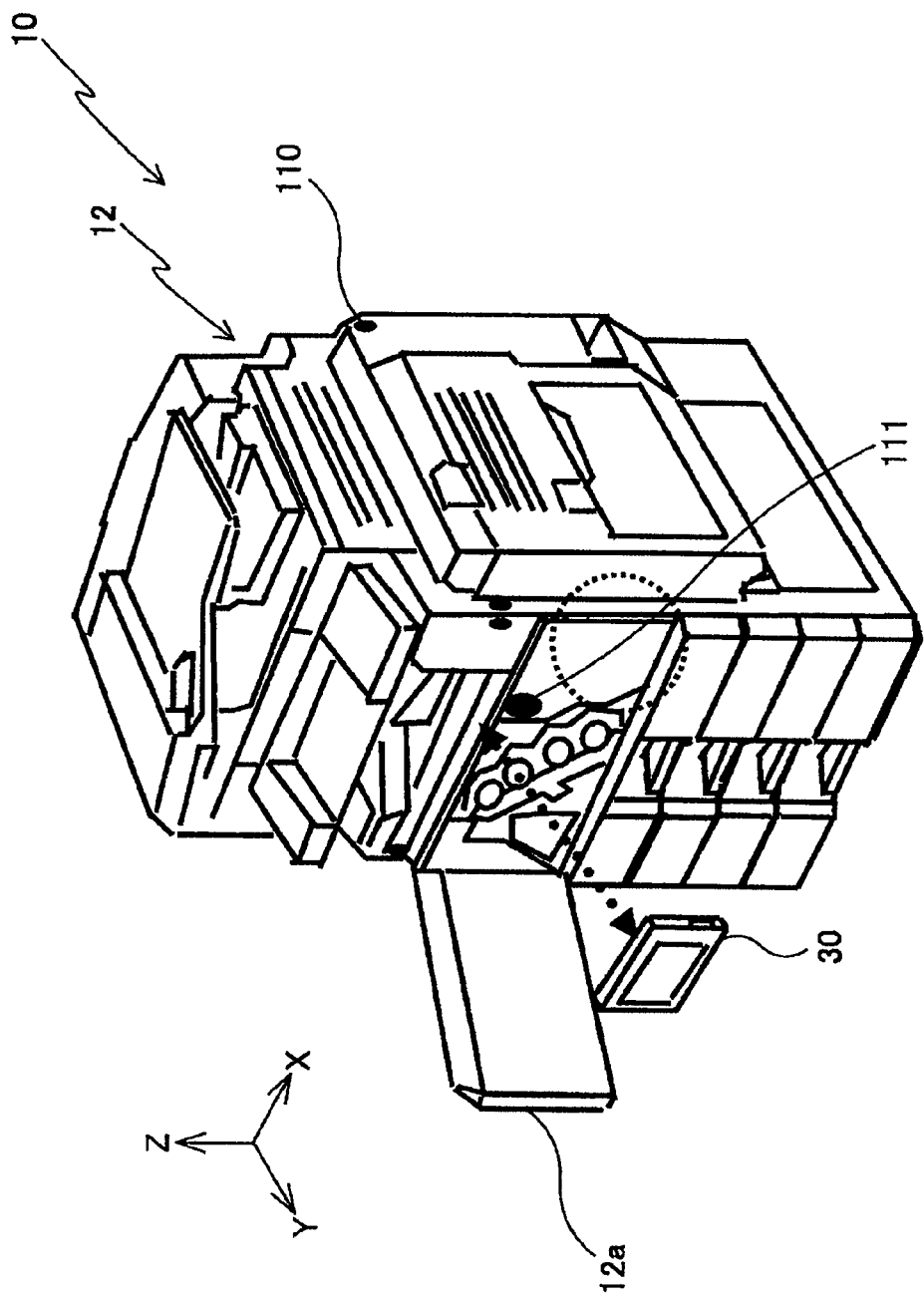
FIG. 20A is a perspective view of the image forming apparatus in a state in which the display operation block is detached from the main body of the apparatus.

As described in detail later, the third control unit 86 displays the information (data) shown in FIG. 15, which is stored in the storage unit 88 in advance, on the LCD 92 through the display control unit 90 based on the above described determination result, the above described calculation result, and the detection information from the abnormal operation detection unit 29. Here, at this time, alternatively to or additionally to the information stored in the storage unit 88, for example, as shown in FIG. 10, during a predetermined time interval (for example, during few seconds) from a start time of inputting an image including the first marked portion 110a and the second marked portion 110b with the digital camera 100, an image within the photographing field of view may be displayed on the LCD 92. In this manner, the user or the like may confirm that the first marked portion 110a and the second marked portion 110b are within the photographing field of view of the digital camera 100.

Figure 11:
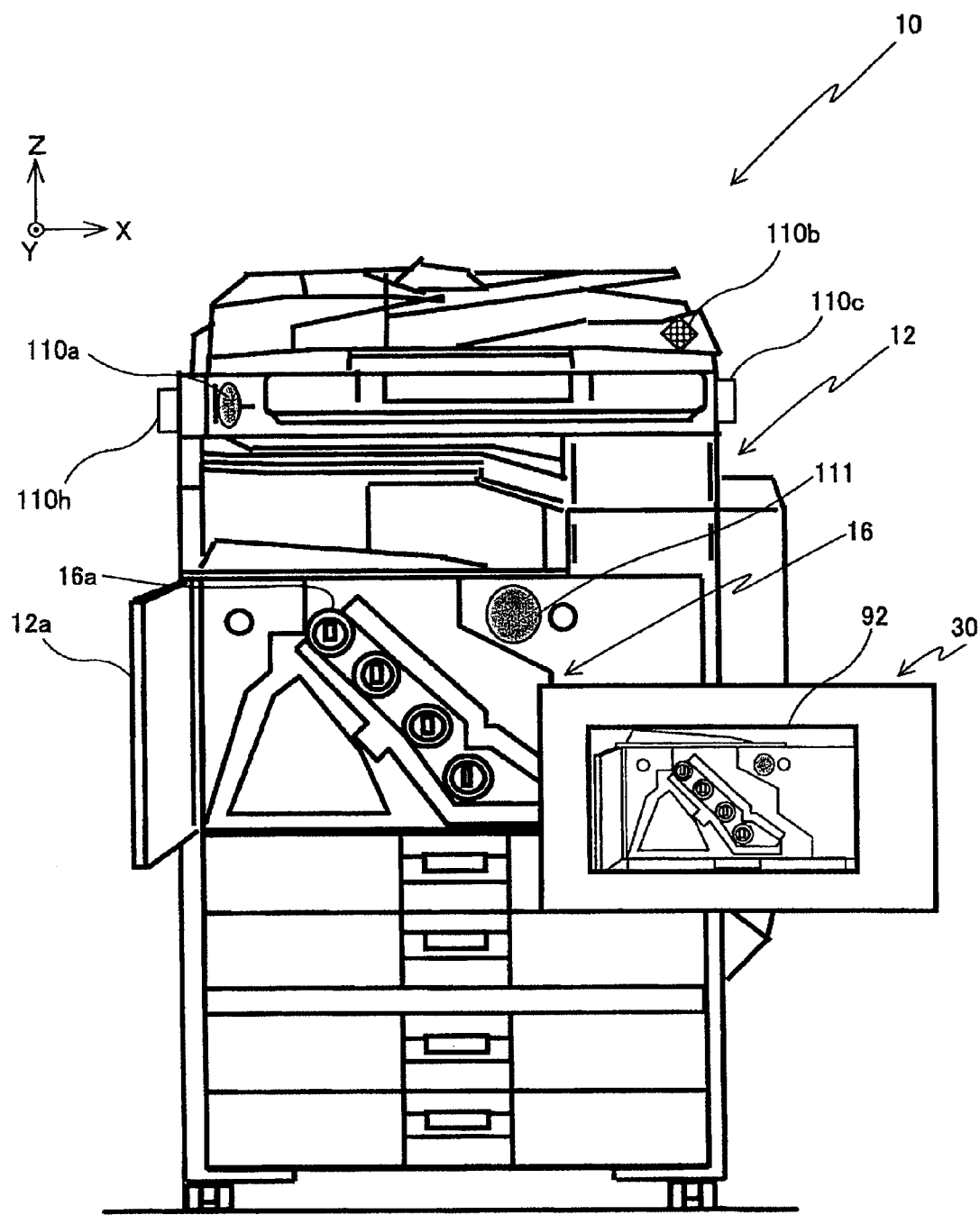
FIG. 11 is a side view illustrating a state in which inside the main body of the apparatus is photographed using the digital camera of the display operation block.

FIG. 11 shows a state in which an opening and closing panel 12a on the main body 12 is opened and the image forming unit 16 is exposed. As shown in FIG. 11, in the vicinity of the image forming unit 16 in the main body 12, an internal marked portion 111 formed of a flat-plate-shaped member is fixed. Here, at least one of a shape, a color, and a pattern of the internal marked portion 111 is different from that of the above described 8 marked portions 110a-h. The opening and closing panel 12a is attached to the main body 12 through a hinge device (not shown) including a pair of hinge members. Here, the hinge members are relatively rotatable around an axis line parallel to the Z-axis. The opening and closing panel 12a is manually rotatable between a position where the opening and closing panel 12a covers the image forming unit 16 and a position where the image forming unit 16 is exposed. Hereinafter, the opening and closing panel 12a is referred to as a front cover, when appropriate.

Figure 12:
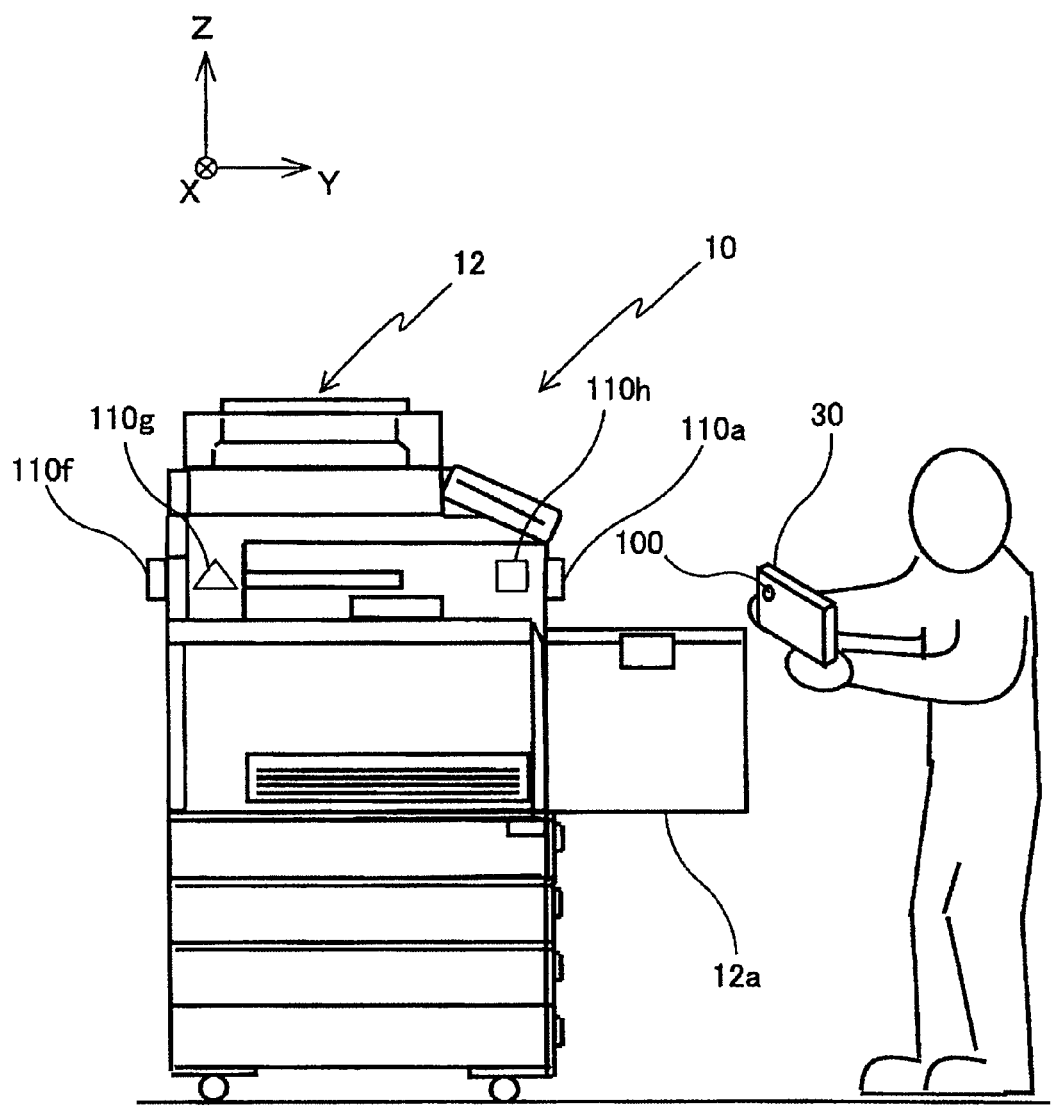
FIG. 12 is a side view illustrating the state in which inside the main body of the apparatus is photographed using the digital camera of the display operation block.

As shown in FIG. 12, when the user or the like photographs the internal marked portion 111 with the digital camera 100 of the display operation block 30, a predetermined image (for example, an image of the image forming unit 16) is displayed on the LCD 92, instead of the contents of all the operations of the operation unit 14, in accordance with an operating state of the main body 12 (cf., FIG. 11), as described later in detail.

Figure 13:
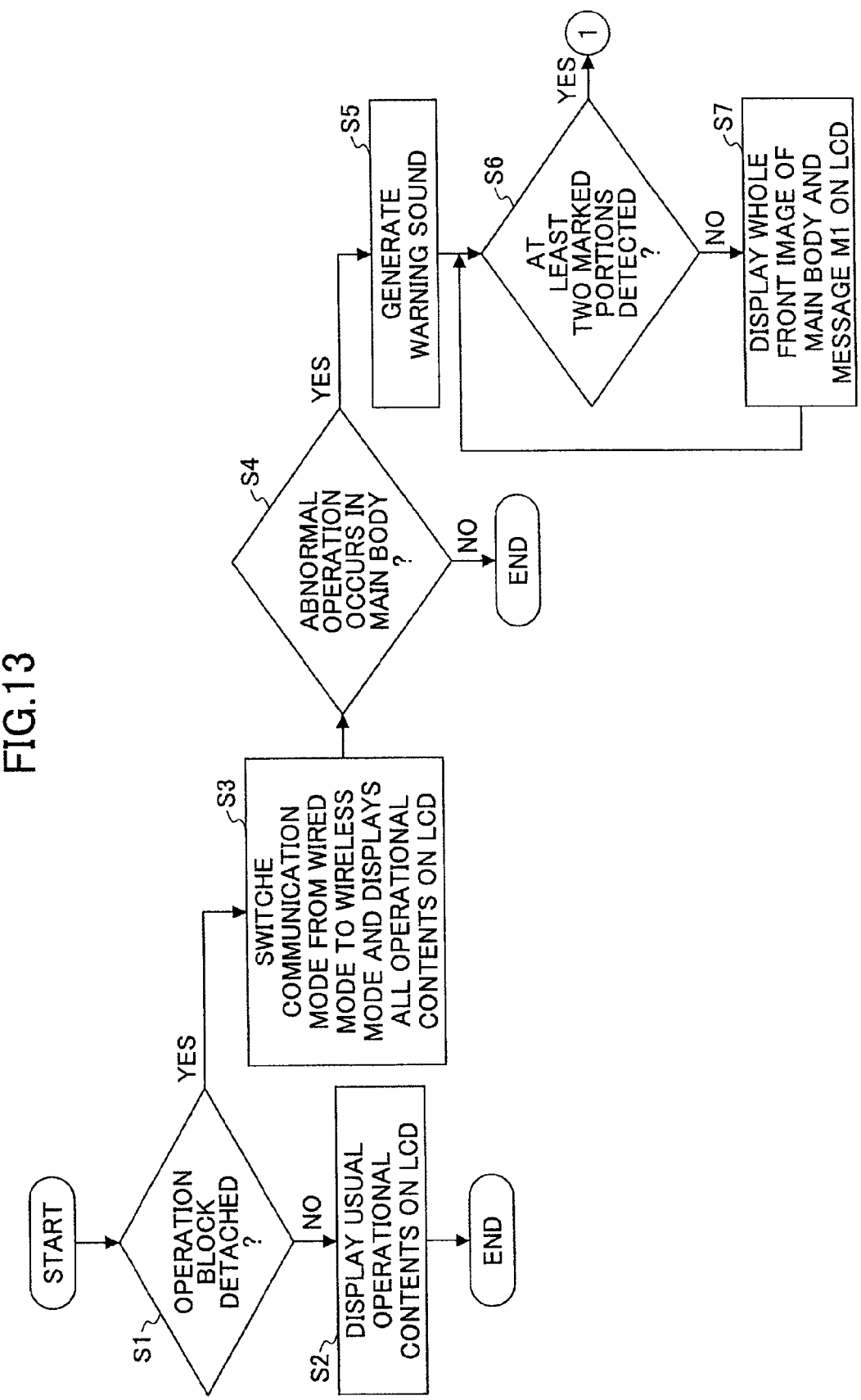
FIG. 13 is a flowchart illustrating a flow of processes performed by a third control unit included in the display operation block.
Figure 14:
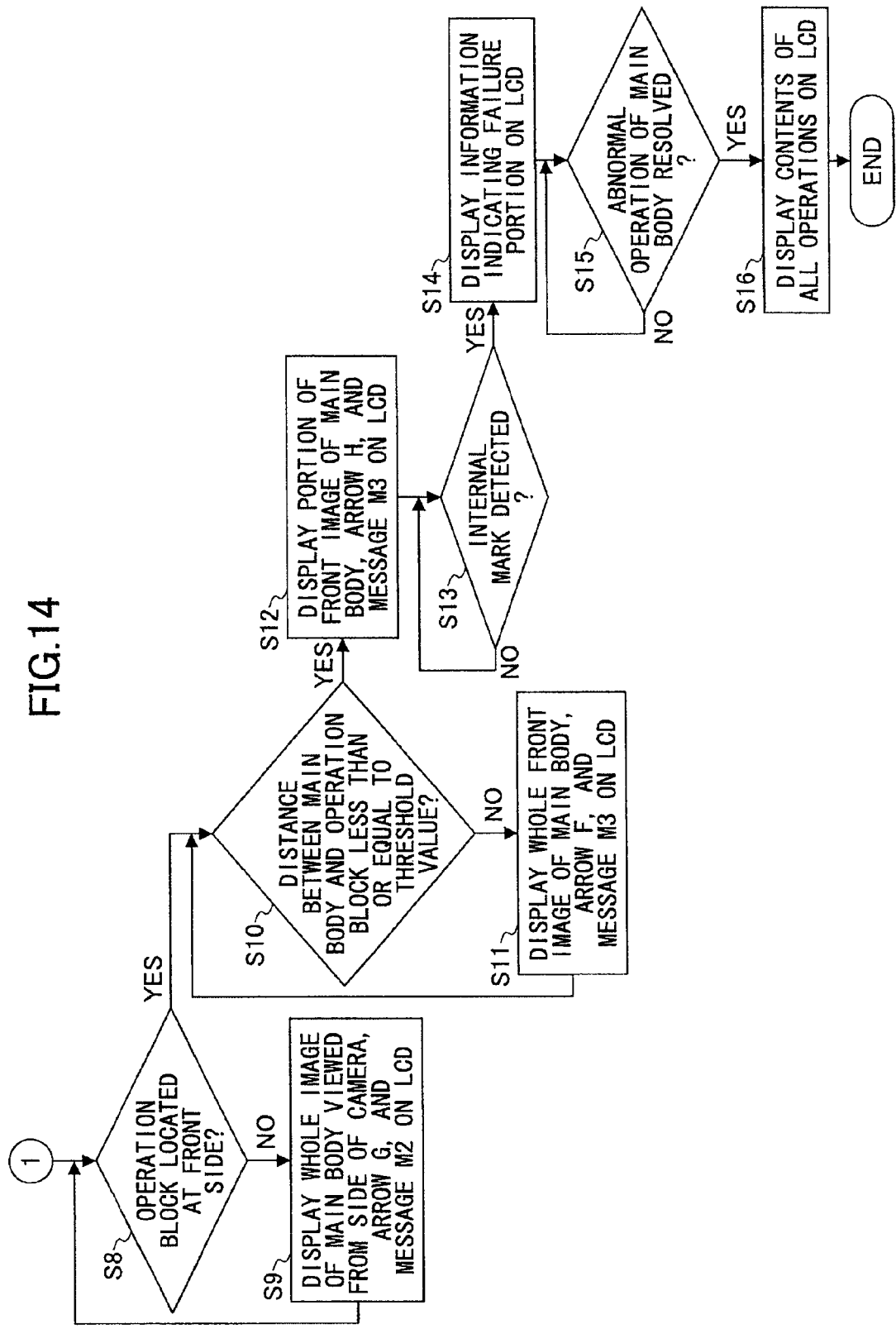
FIG. 14 is a flowchart illustrating the flow of the processes performed by the third control unit included in the display operation block.

Hereinafter, an operation method of the image forming apparatus 10 is explained while associating the operation method with a process flow of the third control unit 86 shown in flowcharts of FIGS. 13 and 14.

Firstly, a case is explained in which the user or the like operates the main body 12 using a first operation block 26, and the second and third operation blocks 28 and 30, which are attached to the main body, so as to perform, for example, copying.

The third control unit 86 determines whether the display operation block 30 is detached from the main body or not, based on the detection information from the detachment detection unit 46 through the control unit 42 (step S1). When the third control unit 86 determines, at step S1, that the display operation block 30 is not detached from the main body 12 (cf. FIG. 7A), the third control unit 86 causes the LCD 92 to display usual operational contents (cf. FIG. 7B) stored in the storage unit 88 (D1 in FIG. 15) (step S2). Then the flow is terminated.

In this case, the user or the like sets a manuscript on the image reading unit 18 or on the automatic document conveyance unit 20, and selects a size of the recording paper, the number of copies, and copy magnification using the first through third operation blocks 26, 28, and 30. Then printing is started. Subsequently, the recording paper is fed from the paper feeding unit 22 to the image forming unit 16, and an image of the manuscript, which has been read by the image reading unit 18, is formed on the recording paper by the image forming unit 16. The recording paper, on which the image is formed, is discharged outside the main body 12 by the paper discharge unit 24.

Next, a case is explained in which the user or the like detaches the display operation block 30 from the main body 12, and operates the main body 12 using the display operation block 30, so as to perform, for example, copying.

When the third control unit 86 determines, at step S1, that the display operation block 30 is detached from the main body 12 (cf. FIG. 8A), the third control unit 86 switches the communication mode between the display operation block 30 and the main body 12 from the wired communication mode to the wireless communication mode. At the same time, the third control unit 86 causes the LCD 92 to display all the operational contents (cf. FIG. 8B) of the operation unit 14 stored in the storage unit 88 (D2 in FIG. 15) (step S3).

With this, the user or the like can remotely perform all the operations of the operation unit 14 (e.g., select a size of the recording paper, the number of copies, copy magnification, start copying, or abort copying, etc.) using the display operation block 30. Here, the user or the like selects an operational item on the touch panel 94 of the display operation block 30 to perform, for example, copying, similar to the above described case in which the display operation block 30 is attached to the main body 12.

Subsequently to step S3, the third operation unit 86 determines whether an abnormal operation (failure), such as a paper jam, occurs in the main body or not (step S4), based on a signal from the abnormal operation detection unit 29 through the control unit 42 and the main body control unit 27. Hereinafter, in the embodiment, "abnormal operation" and "failure" are used in the same meaning.

When the third control unit 86 determines that no abnormal operation occurs in the main body 12 at step S4, the flow terminates. In this case, the user or the like can remotely perform all the operations of the operation unit 14 (e.g., select a size of the recording paper, the number of copies, copy magnification, start copying, or abort copying, etc.) using the display operation block 30.

On the other hand, when the third control unit 86 determines, at step S4, that an abnormal operation occurs in the main body 12, the third control unit 86 causes the buzzer (not shown) in the sound output unit 104 to generate a warning sound during a predetermined time interval (e.g. few seconds) (step S5). Subsequently, the third control unit 86 determines whether at least two of the marked portions 110 are detected or not (step S6).

When the third control unit 86 determines, at step S6, that less than two of the marked portions 110 is detected by the digital camera 100 (cf. FIG. 16A), the third control unit 86 causes the LCD 92 to display the whole front image of the main body 12 stored in the storage unit 88 and a message M1 (D3 in FIG. 15), such as "A failure has occurred. Please point the camera of the operation block at the copy machine." (cf. FIG. 16B) (step S7). After that, the third control unit 86 performs the determination at step S6 again.

When the user or the like points the digital camera 100 of the display operation block 30 to the main body 12 in accordance with the message M1, and when at least two of the marked portions 110 are within the photographing field of view of the digital camera 100, the third control unit 86 determines, at step S6, that at least two of the marked portions 110 are detected. Subsequently, the third control unit 86 determines whether the display operation block 30 is located at the front side (the positive Y-axis side) of the main body 12 or not (step S8).

When the third control unit 86 determines, at step S8, that the display operation block 30 is not located at the front side of the main body 12 (cf. FIG. 17A), the third control unit 86 causes the LCD 92 to display, for example, the whole image of the main body 12 viewed from the side of the display operation block 30 stored in the storage unit 88, an arrow G for guiding the user or the like to the front side of the main body 12, and a message M2 (D4 in FIG. 15), such as "A failure has occurred. Please move in front of the copy machine." (cf. FIG. 17B) (step S9). After that, the third control unit 86 performs the determination at step S8 again.

When the user or the like moves to the front side of the main body 12 in accordance with the message M2, while carrying the display operation block 30, and when the first and second marked portions 110a and 110b are within the photographing field of view of the digital camera 100, the third control unit 86 determines, at step S8, that display operation block 30 is located at the front side of the main body 12.

When the third control unit 86 determines, at step S8, that the display operation block 30 is located at the front side of the main body 12, the third control unit 86 determines whether a distance between the main body 12 and the display operation block 30 is less than or equal to a predetermined threshold value (e.g., 1 m) (step S10).

When the third control unit 86 determines, at step S10, that the distance between the main body 12 and the display operation block 30 is greater than the predetermined threshold value (cf. FIG. 18A), the third control unit 86 causes the LCD 92 to display a message M3, such as "A failure has occurred. Please open the front cover, and check inside the main body.", the whole front image of the main body 12, and an arrow F indicating a position of the front cover and a method of opening the front cover (D5 in FIG. 15), which are stored in the storage unit 88 (cf. FIG. 18A) (step S11). Namely, at step S11, when the user or the like carrying the display operation block 30 is located at a relatively distant position from the main body 12 from where the whole image of the main body can be observed, the LCD 92 displays information with which the user or the like can easily understand, at a first glance, the position of the opening and closing panel 12a with respect to the main body 12 and the method of opening the opening and closing panel 12a. After that, the third control unit 86 performs the determination at step S10 again.

When the third control unit 86 determines, at step S10, that the distance between the main body 12 and the display operation block 30 is less than or equal to the threshold value (cf. FIG. 19A), the third control unit 86 causes the LCD 92 to display a magnified image of a portion (an upper half portion) of the front image of the main body 12, an arrow H indicating a position of the front cover and a method of opening the front cover, and a message M4 (D6 in FIG. 15), such as "A failure has occurred. Please open the front cover, and check inside the main body.", which are stored in the storage unit 88 (cf. FIG. 19B) (step S12). Namely, at step S12, when the user or the like carrying the display operation block 30 is located at a relatively closer position from the main body 12 from where, for example, only the upper half portion the main body can be observed, the LCD 92 displays information with which the user or the like can easily understand, at a first glance, the position of the opening and closing panel 12a with respect to the main body 12 and the method of opening the opening and closing panel 12a.

Subsequently to step S12, the third control unit 86 determines whether the internal marked portion 111 has been detected or not (step S13). When the third control unit 86 determines, at step S13, that the internal marked portion 111 has not been detected, the third control unit performs the determination at step S13 again.

Then the user or the like opens the opening and closing panel 12a and exposes the image forming unit 16. After that, the user or the like photographs the image forming unit 16 and the internal marked portion 111 using the digital camera 100 of the display operation block 30 (cf. FIG. 20A).

When the third control unit 86 determines, at step S13, that the internal marked portion 111 has been detected, the third control unit 86 causes the LCD 92 to display information indicating a failure portion in the image forming unit 16 (cf. FIG. 20B) (step S14). As shown in FIG. 20B, the information indicating the failure portion is generated, for example, by surrounding the failure portion with a dashed line in the image of the image forming unit 16 at a normal time, which is stored in the storage unit 88. Here, it is assumed that, subsequently to the detection of the internal marked portion 111, the third control unit 86 keeps causing the LCD 92 to display the information indicating the failure portion, even if the internal marked portion 111 is no longer detected, namely, even if the internal marked portion 111 is out of the photographing field of view of the digital camera 100. Here, the display of the information indicating the failure portion may be performed, for example, by coloring only the failure portion or by coloring portions other than the failure portion.

Further, when the internal marked portion 111 is out of the photographing field of view of the digital camera 100 after the information indicating the failure portion is displayed on the LCD 92, the third control unit 86 may cause the LCD 92 to display a magnified image of the failure portion. In this case, the user or the like can understand in more detail the condition of the failure by observing the magnified image. Therefore, the user or the like can respond more quickly and appropriately.

Then the user or the like performs the work to resolve the failure, while observing the image displayed on the LCD 92, which identifies the failure portion. At this time, the user or the like can perform the work while observing the actual failure portion and the image identifying the failure portion simultaneously. Therefore, the user or the like can start the work to resolve the failure immediately and easily.

Further, at step S14, the third control unit 86 may cause the LCD 92 to display a message for resolving the failure, in addition to the image identifying the failure portion. Specifically, the third control unit 86 may compare the image of the image forming unit 16 at a normal time (D7 in FIG. 15) stored in the storage unit 88 and the image of the image forming unit 16 during the failure, which is currently photographed by the digital camera 100, and the third control unit 86 may cause the LCD 92 to display a specific content of the work for resolving the failure, based on the comparison result.

For example, when a paper jam failure is to be resolved, a message, such as "Please gently withdraw the recording paper in the direction of the arrow.", including a figure may be displayed as the content of the work. Further, when a paper jam is caused by exhaustion, malfunction, or contamination of a component of the main body 12, a specific content, such as a specific component in the main body 12 (e.g., a pair of conveyance rollers of the image forming unit 16) is to be cleaned, fixed, or replaced, may be displayed as a content of the work. Further, a specific content of a procedure and a method of the cleaning, the fixing, or the replacement may be additionally displayed.

Further, when the user or the like is performing the work to resolve the failure, the LCD 92 may display an image corresponding to a rate of progression of the work, namely, an image corresponding to an extent of the resolution of the failure. Specifically, when the work to resolve a paper jam in the image forming unit 16 is performed, the LCD 92 may display an image indicating the position in the image forming unit 16 where the jammed paper is remaining and the extent of the remainder of the jammed paper in the image forming unit 16, in real time (in a time series). With this, working efficiency of the user or the like is greatly improved.

Subsequently to step S14, the third control unit 86 determines whether the abnormal operation of the main body 12 has been resolved or not, based on the presence or absence of a detection signal from the abnormal operation detection unit 29 (step S15).

When the third control unit 86 determines, at step S15, that the abnormal operation of the main body 12 has not been resolved, the third control unit 86 performs the determination at step S15 again.

When the third control unit 86 determines, at step S15, that the abnormal operation of the main body 12 has been resolved, the third control unit 86 causes the LCD 92 to display the contents of all the operations of the operation unit 14 (step S16). Then the flow is terminated. Further, at step S16, in order to notify the user or the like of the resolution of the abnormal operation of the main body 12, the third control unit 86 may cause the LCD 92 to display a message, such as "The failure has been resolved.", for a predetermined time interval, prior to indicating the contents of all the operations of the operation unit 14, or at the same time that the contents of all the operations of the operation unit 14 is indicated.

After the user or the like confirms that the abnormal operation of the main body 12 has been resolved by looking at the LCD 92 of the display operation block 30, the user or the like closes the opening and closing panel 12a. Then the user or the like continues, for example, copying, using the detached display operation block 30 or using the first through third operation blocks 26, 28, and 30 after attaching the display operation block 30 to the main body 12.

In the above, the case is explained in which the main body 12 is remotely operated using the display operation block 30. Hereinafter, a case is simply explained in which the main body 12 is remotely operated using the second operation block 28. Unlike the display operation block 30, since the second operation block 28 does not include a LCD, when an abnormal operation occurs in the main body 12, the second operation block 28 does not display information for responding to the abnormal operation, namely, the second operation block 28 does not cause the user or the like to visualize the information for responding to the abnormal operation. Therefore, when an abnormal operation occurs in the main body 12, the second operation block 28 transmits necessary information to the user or the like using sounds as a medium for the transmission.

Specifically, when an abnormal operation occurs in the main body 12, in the second operation block 28, the second control unit 72 causes the buzzer (not shown) in the sound output unit 108 to generate a warning sound for a predetermined time interval (for example, for few seconds), and draws the user or the like's attention. Then the user or the like photographs at least two of the marked portions 110 using the digital camera 106 of the second operation block 28, which has been detached from the main body 12. At this time, similar to the third control unit 86, the second control unit 72 obtains relative positional information between the main body 12 and the second operation block 28 by analyzing at least two of the marked portions 110, which have been input by the digital camera 106. After that, the second control unit 72 outputs a necessary message (for example, a message similar to the above described messages M1-M4) for responding to the abnormal operation by sounds through a speaker (not shown) of the sound output unit 108, based on the obtained relative positional information. With this, the user or the like can respond to the abnormal operation.

With the image forming apparatus 10 configured as described above, relative positional information between the main body 12 and the display operation block 30 can be accurately obtained by inputting at least two of the marked portions 110 attached to the main body 12 using the digital camera of the display operation block 30, which has been detached from the main body 12, and by analyzing the image data being input. With this, an image or a message in accordance with the relative positional information between the main body 12 and the display operation block 30 can be displayed on the LCD 92 of the display operation block 30, which has been detached from the main body 12, in accordance with a state of the main body 12.

Further, when an abnormal operation occurs in the main body during remote operation of the main body 12 by the user or the like using the display operation block 30, information displayed on the LCD 92 of the display operation block 30 is switched from information about the operations of the main body 12 to information for responding to the abnormal operation of the main body 12. Furthermore, contents of the information for responding to the abnormal operation is switched to contents of the work to be done by the user or the like, depending on the relative positions between the display operation block 30 and the main body 12, namely, depending on the relative positions between the user or the like holding the display operation block 30 and the main body 12. In this manner, the user or the like can easily respond to the abnormal operation of the main body 12 by sequentially following the contents displayed on the LCD 92.

Further, when an abnormal operation occurs in the main body 12, since a position of the user or the like with respect to the main body 12 can be accurately determined no matter where in the surrounding area of the main body 12 the user or the like holding the display operation block 30 is located, information for guiding the user or the like to easily access the front side of the main body 12, where the opening and closing panel 12 is arranged, can be displayed on the LCD 92. Namely, since an image of the whole or a part of the main body viewed from the position where the user or the like holding the display operation block 30 is currently located is displayed on the LCD 92 in a state in which the position of the opening and closing panel 12a and the method of opening the opening and closing panel 12a are specified, the user or the like can understand, at a glance, the position of the opening and closing panel 12a and the method of opening the opening and closing panel 12a only by looking at the LCD 92, and the user or the like can easily access the position where the abnormal operation has occurred.

Further, when the user or the like opens the opening and closing panel 12a and photographs the internal marked portion 111, information for specifying a portion in the image forming unit 16 where the abnormal operation has occurred (the failure portion) is displayed on the LCD 92. Thus the user or the like can perform the work for resolving the failure while looking at the information for specifying the failure portion and the image forming unit 16 simultaneously. Therefore, working efficiency can be greatly improved in comparison to, for example, a conventional case where the work for resolving a failure is performed by alternately looking at an image specifying the failure portion displayed on a LCD, which is integrated in a main body of a device, and an actual failure portion.

Further, the embodiment is not limited to the above described embodiment, and various modifications can be made.

In the above embodiment, the two marked portions 110 are arranged at the corresponding side surface of the main body 12. However, the embodiment is not limited to this. For example, one marked portion or more than or equal to three marked portions may be arranged at the corresponding side surface of the main body 12. Alternatively, only one marked portion may be attached to the main body 12. In this case, the marked portion attached to the main body may be formed to be large (for example, formed in a disk shape of a diameter from 10 cm to 20 cm, or a polygonal flat-plate shape, whose one side is from 5 cm to 15 cm). With this large marked portion, a photographing angle of a digital camera may be obtained from a degree of deformation of an outer shape of the marked portion. Further, in this case, for example, plural characters or figures may be displayed at corresponding plural portions in the marked portion. With the plural characters or figures, a photographed portion in the marked portion and the photographing angle of the digital camera may be obtained.

In the above embodiment, at least one of the shape, the color, and the pattern of one of the marked portions 110 is different from that of the other marked portions 110. Alternatively, each marked portion may include a character, number, or symbol, which is specific to the marked portion, or each marked portion may include a two-dimensional bar code, which is specific to the marked portion. Namely, it suffices that each marked portion is recognized to be different from other marked portions by the digital camera of the display operation block 30.

In the above described embodiment, the flat board shaped members are used for the marked portions 110 and the internal marked portion 111. However, the embodiment is not limited to this.

In the above embodiment, the digital camera is included in the display operation block 30 and the marked portions are attached to the main body 12. Alternatively, marked portions may be attached to the display operation block 30 and the main body may include digital cameras.

In the above embodiment, the display operation block 30 includes the two digital cameras. However, the display operation block 30 may include one camera, or the display operation block 30 may include 3 or more cameras.

In the above embodiment, the image data of the marked portions photographed by the digital camera is analyzed by the third control unit 86 of the display operation block 30. However, the embodiment is not limited to this. For example, the image data of the marked portions may be transmitted to the control unit 42 of the base 25 and the image data of the marked portions may be analyzed by the control unit 42.

In the above described embodiment, the image data of the marked portions photographed by the digital camera is analyzed by the operation unit 14. However, the embodiment is not limited to this. For example, the image data of the marked portions may be transmitted to the main body 12, and the image data of the marked portions may be analyzed by the main body control unit 27.

In the above embodiment, the contents to be displayed on the LCD 92 of the display operation block 30 are stored in the storage unit 88 of the display operation block 30. Alternatively, the contents to be displayed on the LCD 92 may be stored in the storage unit 44 of the base 25.

In the above embodiment, the contents to be displayed on the LCD 92 of the display operation block 30 are stored in the operation unit 14. Alternatively, the contents to be displayed on the LCD 92 may be stored in the main body 12.

In the above embodiment, the relative positional information between the display operation block 30 and the main body 12 are determined by photographing the image of the marked portions 110 using the digital camera. However, the embodiment is not limited to this. For example, relative positional information between the display operation block 30 and the main body 12 of the device 10 may be determined by attaching one of a transmission unit and a receiving unit of a sensor that can detect a distance between two objects, such as an optical sensor or a ultrasonic sensor, to the display operation block 30 and attaching the other to the main body 12 of the device 10.

In the above embodiment, the operation unit 14 is arranged at the side of the side surface of the main body 12 in the positive Y-axis direction. However, the embodiment is not limited to this. For example, the operation unit 14 may be arranged at any one of the sides of the side surfaces of the main body 12 in the positive X-axis direction, in the negative X-axis direction, and the negative Y-axis direction.

In the above embodiment, the operation unit 14 is divided into three operation blocks. However, the embodiment is not limited to this. The operation unit 14 may be divided into two operation blocks, or the operation unit 14 may be divided into 4 or more operation blocks. However, in this case, at least one of the operation blocks may be required to be detachable with respect to the main body 12. Further, the at least one of the operation blocks may be required to enable a bidirectional wireless communication with the main body, and the at least one of the operation blocks may be required to have a display device, such as a LCD.

The third control unit 86 may output the message as sounds through the speaker (not shown) of the sound output unit 104, in addition to displaying the message, at each of the steps S7, S9, S11, and S13. With this, transmission of the necessary information to the user or the like is ensured.

The main body control unit 27 or the control unit 42 may be connected to a server on a network, such as the Internet, so as to enable bidirectional communications. In this case, the detection information from the abnormal operation detection unit 29 and, for example, data of an image of the image forming unit 16 at the time when the image forming unit 16 operates abnormally, which is input by the digital camera, may be transmitted to the above described server, and information for responding to the abnormal operation, such as information for specifying the portion where the abnormal operation has occurred and information for resolving the abnormal operation, may be received from the above described server. Further, the information for responding to the abnormal operation received by the main body control unit 27 or the control unit 42 may be displayed on the LCD 92 through the third control unit 86. With this, the user or the like can quickly and easily perform the work for resolving the abnormal operation, based on the information supplied from, for example, a manufacturer of the image forming device 10 (from the above described server), such as the information for specifying the portion where the failure has occurred or the information about the procedures for fixing. Alternatively to or additionally to the above acquisition of the information from the above described server, the information for responding to the above abnormal operation may be stored in the main body control unit 27 or the storage unit 40 in advance. In this case, the information for responding to the abnormal operation may be displayed on the LCD 92, based on the detection information from the abnormal operation detection unit 29 and, for example, data of the image of the image forming unit 16 at the time when the image forming unit 16 operates abnormally, which is input by the digital camera.

Further, an information input unit, such as a keyboard, may be connected to the main body control unit 27 or the control unit 42. Using the information input unit, additional information, such as contents of the malfunction or contents of fixing, can be added to the image data of the failure portion being input by the digital camera 100. The image data, to which the additional information has been added, may be output, for example, by printing the image data on a sheet, such as a recording paper. Alternatively, the image data, to which the additional information has been added, may be output to an external device, an external memory, or a server on the network, as electronic data. In this manner, the user or the like can leave a record of the malfunction or the fixing, and the record can facilitate a next response by the user or the like.

In the above described embodiment, when the internal marked portion 111 is detected, the information for specifying the failure portion is displayed on the LCD 92. However, the embodiment is not limited to this. Specifically, when an abnormal operation of the main body 12 is detected by the abnormal operation detection unit 29, the information for specifying the failure portion may be displayed on the LCD 92. In this first case, after the information for specifying the failure portion is displayed on the LCD 92, in addition to the information for specifying the failure portion, the information for easily guiding the user to the failure portion may be displayed on the LCD 92. Further, when at least two of the marked portions 110 are photographed by the digital camera 100, the LCD 92 may display the information for specifying the failure portion. In this second case, the information for easily guiding the user to the failure portion may be displayed on the LCD 92, in addition to the information for specifying the failure portion. Further, in the above described first and second cases, when the internal marked portion 111 is detected, alternatively to or additionally to the information for specifying the failure portion, detailed information about the failure portion may be displayed on the LCD 92. Or, alternatively to or additionally to the information for specifying the failure portion, specific information about the work for resolving the failure may be displayed on the LCD 92. Further, in the above described first and second cases, since at least the information for specifying, in detail, the failure portion is displayed on the LCD 92, the internal marked portion 111 may not be provided. Similarly, the specific work information for resolving the failure may be displayed on the LCD 92, when the abnormal operation of the main body 12 is detected by the abnormal operation detection unit 29, or when at least two of the marked portions 110 are photographed by the digital camera 100. Further, when the internal marked portion 111 is detected, the specific work information may be switched to more detailed contents.

In the above described embodiment, when the internal marked portion 111 is detected, the information for specifying the failure portion is displayed on the LCD 92. However, the embodiment is not limited to this. For example, a sensor for detecting opening and closing of the opening and closing panel 12a may be included in the main body 12. In this case, when the opening and closing panel 12a is opened, namely, based on the detection information from the sensor, the information for specifying the failure portion may be displayed on the LCD 92. In this case, the internal marked portion 111 may not be provided.

The contents and the number of the images and the messages stored in the storage unit 88 are not limited to the above description, and the contents and the number of the images and the messages may be changed depending on the relative positional information between the main body 12 and the display operation block 30. Specifically, for example, plural threshold values (the threshold value of step S10 in FIG. 14) of the distance between the main body 12 and the display operation block 30 may be defined, and in accordance with the plural threshold values, the number of the images and the messages stored in the storage unit 88 may be increased, or contents of the messages may be changed. Here, the plural threshold values are used as the references for switching the information displayed on the LCD 92.

In the above embodiment, the various operable operational keys being provided to the first and the second operation blocks are not provided to the display operation block 30. However, alternatively to or additionally to the touch panel 94, the operational keys may be provided to the display operation block 30.

In the above described embodiment, the embodiment is explained by exemplifying the paper jam as the abnormal operation that may occur in the main body 12. However, the explanation can be applied to other abnormal operations of the main body. In this case, the user or the like performs cleaning, replacement, or fixing of components, in accordance with the information displayed on the LCD, and resolves the abnormal operation.

In the above embodiment, when no abnormal operation occurs in the main body 12, the contents of all the operations of the operation unit 14 are only displayed on the display operation block 30, which has been detached from the main body 12. Thus, for example, when the recording papers having been selected by the user or the like using the display operation block 30, which has been detached from the main body 12, are not stored in the paper feeding unit 22 or not set on the image reading unit 18 or on the automatic document conveyance unit 20, the sound output unit 104 may output a warning sound and draw the user or the like's attention, similar to the above described case in which the abnormal operation occurs in the main body. At the same time, information corresponding to the relative positional information between the main body 12 and the display operation block 30, which is for easily guiding the user or the like to the paper feeding unit 22, the image reading unit 18, or the automatic document conveyance unit 20, may be displayed on the LCD 92.

Figure 21A:
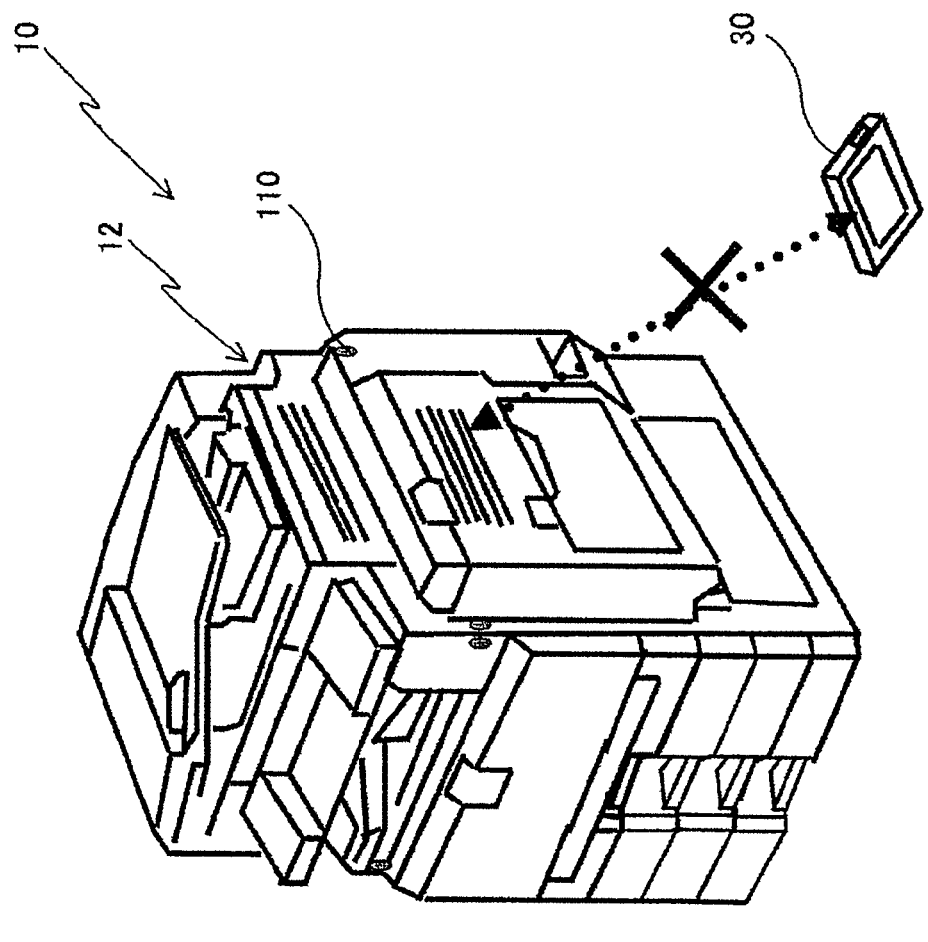
FIG. 21A is a perspective view of the image forming apparatus of a modified example in a state in which the display operation block is detached from the main body of the apparatus.
Figure 21B:
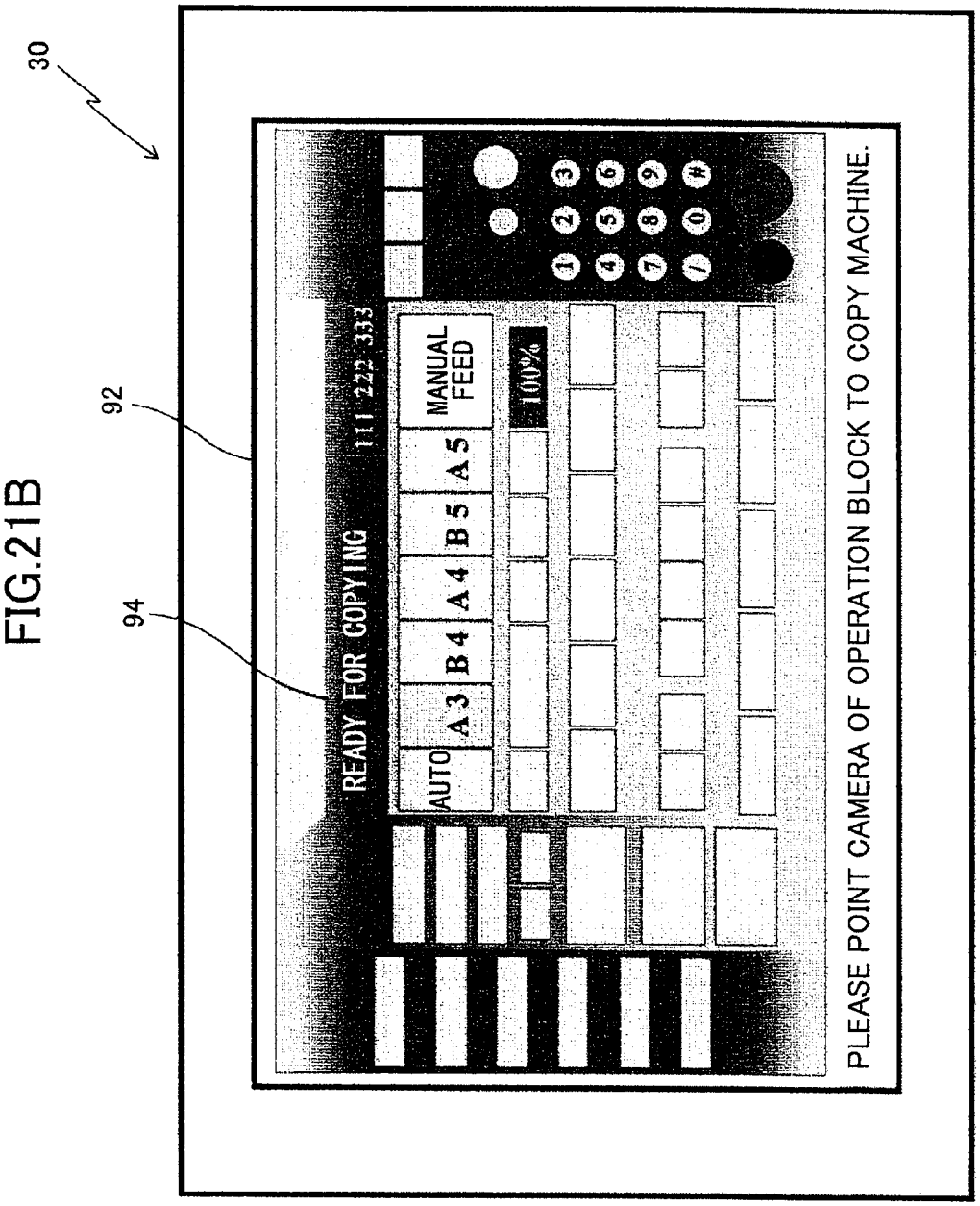
FIG. 21B is a plan view of the display operation block of the modified example in the state in which the display operation block is detached from the main body of the apparatus.

Specifically, when the image of less than two of the marked portions 110 is photographed by the digital camera 100 of the display operation block 30 (cf. FIG. 21A), in addition to the contents of all the operations of the operation unit 14, a message, such as "Please point the camera of the operation block at the copy machine.", is displayed (cf. FIG. 21B). Then, when the user or the like photographs the image of at least two of the marked portions 110 using the digital camera 100, the information corresponding to the relative positional information between the main body 12 and the display operation block 30, such as the information for guiding the user or the like to the paper feeding unit 22, the image reading unit 18, or the automatic document conveyance unit 20, a method of supplementing the recording papers, or a method for setting the original documents, may be displayed on the LCD 92. In this manner, the user or the like holding the display operation block 30 can easily access the paper feeding unit 22, the image reading unit 18, or the automatic document conveyance unit 20 by following the information displayed on the LCD 92, no matter where in the surrounding area of the main body 12 the user or the like is located. Therefore, the user or the like can easily supplement the recording paper, or set the original documents.

In the above described embodiment, the copy machine, for which the toner system is adopted, is used as an example of the image forming apparatus. However, the embodiment is not limited to this. For example, an inkjet copy machine, an inkjet facsimile machine, a combination thereof, or an inkjet printer may be used.

In the above described example, the image forming apparatus is used as an example of the electronic apparatus. However, the embodiment is not limited to this. For example, a paper processing device for applying a process, such as a folding process, a punch process, or a cutting process, to a recording paper, or a combined apparatus of the paper processing device and the image forming apparatus may be used. Namely, an electronic apparatus having an operation block may be used such that the operational block forming a part of an operation unit for operating a main body of the electronic apparatus, the operational block is detachable with respect to the main body of the electronic apparatus, and the operational block enables, at least, bidirectional wireless communications with the main body of the electronic apparatus.

As explained above, an electronic apparatus according to the embodiment of the present invention is suitable for being remotely operated using an operation block, which has been detached from a main body of the electronic apparatus. Further, an information displaying method for the electronic apparatus according to the embodiment is suitable for displaying information on the operation block, which has been detached from the main body of the electronic apparatus.

The present invention is not limited to the specifically disclosed embodiments, and variations and modifications may be made without departing from the scope of the present invention.

The present application is based on Japanese priority application No. 2011-025570 filed on Feb. 9, 2011, the entire contents of which are hereby incorporated herein by reference.

What is claimed is:

1. An electronic apparatus comprising:
a main body of the electronic apparatus;
an operation unit including an operation block having a display unit, the operation block being detachable with respect to the main body of the electronic apparatus, and the operation block enabling at least a bidirectional wireless communication with the main body of the electronic apparatus;
a detection unit configured to visually detect relative positional information between the operation block and at least one predetermined portion of the main body of the electronic apparatus, when the operation block is detached from the main body of the electronic apparatus,
wherein the operation block being detached from the main body of the electronic apparatus is able to display information corresponding to the relative positional information on the display unit, in accordance with a condition of the main body of the electronic apparatus.

2. The electronic apparatus according to claim 1,
wherein the detection unit includes
an image input unit configured to input an image of a photographic subject to the electronic apparatus, the image input unit being arranged in one of the operation block and the main body of the electronic apparatus;
marked portions attached to the other one of the operation block and the main body of the electronic apparatus; and
an analyzing unit configured to analyze data of the image, the image being input from the image input unit,
wherein, when the operation block is detached from the main body of the electronic apparatus, the analyzing unit detects the relative positional information by analyzing data of images of the marked portions, the images of the marked portions being input from the image input unit.

3. The electronic apparatus according to claim 2,
wherein the operation block includes at least the image input unit,
wherein the operation unit is arranged at a portion at a side of a first side surface of the main body of the electronic apparatus, and
wherein at least a first marked portion included in the marked portions is attached to the first side surface of the main body, and at least a second marked portion included in the marked portions is attached, at least, to a second side surface of the main body, the second side surface being connected to the first side surface.

4. The electronic apparatus according to claim 3,
wherein at least a third marked portion included in the marked portions is attached to a third side surface of the main body, the third side surface being connected to the first side surface through the second side surface.

5. The electronic apparatus according to claim 3,
wherein external appearances of the marked portions are different to each other, and
wherein the images of the marked portions are input to the electronic apparatus as images being different to each other by the image input unit.

6. The electronic apparatus according to claim 1,
wherein the main body of the electronic apparatus includes an abnormal operation detection unit configured to detect an abnormal operation of the main body of the electronic apparatus, and
wherein, when the operation block being detached from the main body of the electronic apparatus receives detection information of the abnormal operation from the abnormal operation detection unit through a communication unit, the operation block causes the display unit to display the information corresponding to the relative positional information for responding to the abnormal operation.

7. The electronic apparatus according to claim 6,
wherein the information corresponding to the relative positional information for responding to the abnormal operation includes information for easily guiding an operator to a portion of the main body of the electronic apparatus, where the abnormal operation has occurred.

8. The electronic apparatus according to claim 6,
wherein, after receiving the detection information of the abnormal operation from the abnormal operation detection unit through the communication unit, the operation block causes the display unit to display information for resolving the abnormal operation.

9. The electronic apparatus according to claim 8,
wherein the information for resolving the abnormal operation includes information specifying a portion of the main body of the electronic apparatus, where the abnormal operation has occurred.

10. The electronic apparatus according to claim 8,
wherein the information for resolving the abnormal operation includes specific information of a work to be performed at the portion of the main body of the electronic apparatus, where the abnormal operation has occurred.

11. The electronic apparatus according to claim 8,
wherein the detection unit includes
at least an image input unit configured to input an image of a photographic subject to the electronic apparatus, the image input unit being arranged in the operation block;
marked portions attached to the main body of the electronic apparatus; and
an analyzing unit configured to analyze data of the image, the image being input from the image input unit,
wherein an internal marked portion is attached to inside the main body of the electronic apparatus, an external appearance of the internal marked portion being different from external appearances of the marked portions, and
wherein, when an image of the internal marked portion is input from the image input unit of the operation block being detached from the main body of the electronic apparatus, the display unit displays the information for resolving the abnormal operation, or the display unit switches the information for resolving the abnormal operation to be displayed on the display unit to detailed contents.

12. The electronic apparatus according to claim 8,
wherein the detection unit includes
an image input unit configured to input an image of a photographic subject to the electronic apparatus, the image input unit being arranged in one of the operation block and the main body of the electronic apparatus;
marked portions attached to the other one of the operation block and the main body of the electronic apparatus;
an analyzing unit configured to analyze data of the image, the image being input from the image input unit,
wherein the main body of the electronic apparatus is connected to a server on a network so as to enable a communication with the server,
wherein the main body of the electronic apparatus obtains the information for resolving the abnormal operation from the server based on the detection information of the abnormal operation from the abnormal operation detection unit and data of the image input from the image input unit, and
wherein, when the operation block being detached from the main body of the electronic apparatus receives the detection information of the abnormal operation, the operation block causes the display unit to display the information for resolving the abnormal operation.

13. The electronic apparatus according to claim 6,
wherein the main body of the electronic apparatus further includes an image forming unit configured to form a read image on a sheet being conveyed, and
wherein the abnormal operation is a failure to convey the sheet.

14. The electronic apparatus according to claim 6,
wherein the main body or the operation block includes a sound output unit configured to output the information corresponding to the relative positional information for responding to the abnormal operation by a sound.

15. The electronic apparatus according to claim 1,
wherein the main body of the electronic apparatus includes a first storage unit configured to store the information corresponding to the relative positional information in advance, and
wherein, when the detection unit detects the relative positional information, the display unit displays the information corresponding to the relative positional information being stored in the first storage unit.

16. The electronic apparatus according to claim 1,
wherein the operation block includes a second storage unit configured to store the information corresponding to the relative positional information in advance, and
wherein, when the detection unit detects the relative positional information, the display unit displays the information corresponding to the relative positional information being stored in the second storage unit.

17. The electronic apparatus according to claim 2,
wherein the operation block or the main body of the electronic apparatus includes an information input unit,
wherein, when the main body of the electronic apparatus malfunctions, additional information can be added to data of an image of a failure portion of the main body of the electronic apparatus using the information input unit, the data of the image of the failure portion being input by the image input unit, and
wherein the electronic apparatus is able to output the data, to which the additional information has been added, as electronic data or by printing the data on a sheet.

18. An information displaying method for an electronic apparatus including an operation unit having an operation block, the operation block being detachable with respect to a main body of the electronic apparatus, the operation block enabling, at least, a bidirectional wireless communication with the main body of the electronic apparatus, and the operation block including a display unit and an image input unit, the method comprising:
a step of detecting relative positional information between the operation block and the main body of the electronic apparatus by inputting an image of a marked portion attached to the main body of the electronic apparatus using the image input unit of the operation block, when the operation block is detached from the main body of the electronic apparatus, and by analyzing data of the image being input; and
a step of displaying information corresponding to the relative positional information on the display unit, in accordance with a condition of the main body of the electronic apparatus.

19. The method according to claim 18, further comprising:
a step of detecting an abnormal operation of the main body of the electronic apparatus,
wherein, when the abnormal operation has been detected, the method further includes a step of displaying the information for responding to the abnormal operation on the display unit of the operation block being detached from the main body of the electronic apparatus, the information for responding to the abnormal operation corresponding to the relative positional information.

* * * * *